(12) United States Patent
Song

(10) Patent No.: US 12,131,249 B2
(45) Date of Patent: Oct. 29, 2024

(54) ARITHMETIC DEVICES WITH LOOK-UP TABLE FOR NEURAL NETWORK

(71) Applicant: SK hynix Inc., Icheon-si Gyeonggi-do (KR)

(72) Inventor: Choung Ki Song, Yongin-si Gyeonggi-do (KR)

(73) Assignee: SK hynix Inc., Icheon-si (KR)

( * ) Notice: Subject to any disclaimer, the term of this patent is extended or adjusted under 35 U.S.C. 154(b) by 1009 days.

(21) Appl. No.: 17/076,428

(22) Filed: Oct. 21, 2020

(65) Prior Publication Data

US 2021/0132954 A1     May 6, 2021

Related U.S. Application Data

(63) Continuation-in-part of application No. 16/932,400, filed on Jul. 17, 2020, now Pat. No. 12,014,184.
(Continued)

(30) Foreign Application Priority Data

Oct. 31, 2019   (KR) .................. 10-2019-0138114
Dec. 4, 2019    (KR) .................. 10-2019-0160238

(51) Int. Cl.
*G06N 3/048*     (2023.01)
*G06F 1/03*      (2006.01)
*G06F 7/544*     (2006.01)

(52) U.S. Cl.
CPC ............. *G06N 3/048* (2023.01); *G06F 1/03* (2013.01); *G06F 7/5443* (2013.01); *G06F 2207/4824* (2013.01)

(58) Field of Classification Search
CPC .. G06F 7/5443; G06F 2207/4824; G06F 1/03; G06N 3/048
See application file for complete search history.

(56) References Cited

U.S. PATENT DOCUMENTS 5,181,184 A   1/1993 Shim et al.
6,414,687 B1  7/2002 Gibson
(Continued)

FOREIGN PATENT DOCUMENTS

CN   108736876 A   11/2018
DE    19942144 A1   6/2001
(Continued)

OTHER PUBLICATIONS

Meher, Pramod Kumar, An Optimized Lookup-Table for the Evaluation of Sigmoid Function for Artificial Neural Networks, IEEE 2010 (Year 2010).
(Continued)

*Primary Examiner* — Matthew D Sandifer
(74) *Attorney, Agent, or Firm* — WILLIAM PARK & ASSOCIATES LTD.

(57) ABSTRACT

An arithmetic device includes a multiplying-accumulating (MAC) operator and an activation function (AF) circuit. The MAC operator performs a MAC arithmetic operation for weight data and vector data to generate an arithmetic result signal. The AF circuit extracts a first bit group and a second bit group from the arithmetic result signal. In addition, the AF circuit generates an input distribution signal based on the first bit group and the second bit group. Moreover, the AF circuit selects and outputs an output distribution signal that corresponds to the input distribution signal based on an activation function.

20 Claims, 36 Drawing Sheets

Related U.S. Application Data which is a continuation-in-part of application No. 16/919,786, filed on Jul. 2, 2020, now Pat. No. 11,915,125.

(60) Provisional application No. 62/959,574, filed on Jan. 10, 2020, provisional application No. 62/959,593, filed on Jan. 10, 2020, provisional application No. 62/958,614, filed on Jan. 8, 2020, provisional application No. 62/958,609, filed on Jan. 8, 2020.

(56) References Cited

U.S. PATENT DOCUMENTS

| | | | |
|---|---|---|---|
| RE42,643 E | 8/2011 | Oshima et al. | |
| 9,559,836 B1 | 1/2017 | Hata | |
| 10,592,247 B2 | 3/2020 | Tanaka | |
| 2013/0041859 A1 | 2/2013 | Esterlilne | |
| 2014/0376676 A1 | 12/2014 | Schafferer | |
| 2017/0365306 A1 | 12/2017 | Ouyang et al. | |
| 2018/0373977 A1 | 12/2018 | Carbon et al. | |
| 2019/0042922 A1 | 2/2019 | Pillai et al. | |
| 2019/0080223 A1* | 3/2019 | Fraser | G06N 3/04 |
| 2019/0147323 A1* | 5/2019 | Li | G06N 3/047 706/15 |
| 2019/0149315 A1 | 5/2019 | Suzuki et al. | |
| 2021/0004208 A1* | 1/2021 | Lai | G06F 7/5443 |
| 2021/0365241 A1 | 11/2021 | Huang et al. | |
| 2022/0276837 A1 | 9/2022 | Fujinami | |

FOREIGN PATENT DOCUMENTS

| | | |
|---|---|---|
| EP | 0575716 A1 | 12/1993 |
| GB | 2234374 A | 1/1991 |
| JP | 2010050609 A | 3/2010 |
| KR | 1020180053314 A | 5/2018 |
| KR | 20180070187 A | 6/2018 |
| KR | 1020190054454 A | 5/2019 |
| KR | 102032146 B1 | 10/2019 |
| KR | 1020190116024 A | 10/2019 |

OTHER PUBLICATIONS

Piazza, F. et al., Neural Networks with Digital LUT Activation Functions, Proceedings of 1993 International Joint Conference on Neural Networks, IEEE, 1993 (Year: 1993).

Zamanlooy, Babak et al., Efficient VLSI Implementation of Neural Networks with Hyperbolic Tangent Activation Function, IEEE Transactions on very large scale integration (VLSI) Systems, vol. 22, No. 1, 2044 (Year: 2014).

* cited by examiner

FIG.14

| IDST<4:1> | ODST |
|---|---|
| '0001' ('1') | Y1 |
| '0010' ('2') | Y2 |
| ⋮ | ⋮ |
| '1001' ('9') | Y9 (ODST1) |
| '1010' ('10') | Y10 (ODST2) |
| ⋮ | ⋮ |
| '1111' ('15') | Y15 |

FIG.19

| Graph | Sigmoid | Tanh | ReLU | Leaky ReLU | Maxout |
|---|---|---|---|---|---|
| Function | $\sigma(x)=1/(1+e^{-x})$ | $\tanh(x)=2\sigma(2x)-1$ | $f(x)=\max(0,x)$ | $f(x)=1(x<0)(\alpha x)$ $+1(x>=0)(x)$ | $\max(\omega_1^T x+b_1, \omega_2^T x+b_2)$ |

FIG.20

|    | MOUT     |          | ODST   |
| -- | -------- | -------- | ------ |
| 1  | 0.390625 | 0.453125 | 0.4049 |
| 2  | 0.453125 | 0.515625 | 0.4558 |
| 3  | 0.515625 | 0.578125 | 0.5038 |
| 4  | 0.578125 | 0.640625 | 0.5490 |
| 5  | 0.640625 | 0.703125 | 0.5911 |
| 6  | 0.703125 | 0.78125  | 0.6348 |
| 7  | 0.78125  | 0.859375 | 0.6791 |
| 8  | 0.859375 | 0.9375   | 0.7190 |
| 9  | 0.9375   | 1.046875 | 0.7609 |
| 10 | 1.046875 | 1.171875 | 0.8057 |
| 11 | 1.171875 | 1.328125 | 0.8493 |
| 12 | 1.328125 | 1.53125  | 0.8916 |
| 13 | 1.53125  | 1.859375 | 0.9329 |
| 14 | 1.859375 | 2.90625  | 0.9740 |
| 15 | 2.90625  | ・・・     | 1      |

FIG.21

| MOUT<8:1> | DECIMAL | ODST |
|---|---|---|
| '00000000' | '0' | ODST0 |
| '00000001' | '1' | ODST1 |
| ⋮ | ⋮ | ⋮ |
| '00010000' | '16' | ODST16 |
| '00010001' | '17' | ODST17 |
| ⋮ | ⋮ | ⋮ |
| '11110000' | '240' | ODST240 |
| '11110001' | '241' | ODST241 |
| ⋮ | ⋮ | ⋮ |
| '11111111' | '255' | ODST255 |

FIG.23

| MOUT<L> | 8 | 7 | 6 | 5 | 4 | 3 | 2 | 1 |
|---|---|---|---|---|---|---|---|---|
| DECIMAL | $2^7$ | $2^6$ | $2^5$ | $2^4$ | $2^3$ | $2^2$ | $2^1$ | 1 |

$2^7$ → MSB<4> ⎫
$2^6$ → MSB<3> ⎬ First bit group
$2^5$ → MSB<2> ⎪
$2^4$ → MSB<1> ⎭

$2^3$ → SHB<2> ⎫
$2^2$ → SHB<1> ⎬ Second bit group

FIG.24

| MOUT<8:1> | MSB<4:1> | SHB<2:1> |
|---|---|---|
| '00000000' | '0000' | '00' |
| '00000100' | '0000' | '01' |
| '00001000' | '0000' | '10' |
| '00001100' | '0000' | '11' |
| '00010000' | '0001' | '00' |
| '00010100' | '0001' | '01' |
| '00011000' | '0001' | '10' |
| '00011100' | '0001' | '11' |
| ⋮ | ⋮ | ⋮ |
| '00110000' | '0011' | '00' |
| ⋮ | ⋮ | ⋮ |
| '01000000' | '0100' | '00' |
| ⋮ | ⋮ | ⋮ |
| '11110000' | '1111' | '00' |

FIG.26

| SHB<2> | SHB<1> | SEL1 | SEL2 | COR |
|--------|--------|------|------|-----|
| 0 | 0 | H | L | 0 |
| 0 | 1 | | | |
| 1 | 0 | L | H | 1 |
| 1 | 1 | | | |

FIG.27

| x | MSB<4:1> | SHB<2:1> | COR | IDST<4:1> | ODST |
|---|---|---|---|---|---|
| x1 | '0001' | '00' | '0' | '0001' | ODST16 |
| x2 | '0001' | '01' | '0' | '0001' | ODST16 |
| x3 | '0001' | '10' | '1' | '0010' | ODST32 |
| x4 | '0001' | '11' | '1' | '0010' | ODST32 |
| x5 | '0010' | '00' | '0' | '0010' | ODST32 |

FIG.31

| SHB<2> | SHB<1> | SEL1 | SEL2 | COR |
|---|---|---|---|---|
| 0 | 0 | H | L | 0 |
| 0 | 1 | | | |
| 1 | 0 | | | |
| 1 | 1 | L | H | 1 |

FIG.32

| x | MSB<4:1> | SHB<2:1> | COR | IDST<4:1> | ODST |
|---|---|---|---|---|---|
| x1 | '0001' | '00' | '0' | '0001' | ODST16 |
| x2 | '0001' | '01' | '0' | '0001' | ODST16 |
| x3 | '0001' | '10' | '0' | '0001' | ODST16 |
| x4 | '0001' | '11' | '1' | '0010' | ODST32 |
| x5 | '0010' | '00' | '0' | '0010' | ODST32 |

FIG.36

| MSB<4> | SHB<2> | SHB<1> | SEL1 | SEL2 | COR |
|---|---|---|---|---|---|
| 1 | 0 | 0 | H | L | 0 |
| 1 | 0 | 1 | H | L | 0 |
| 1 | 1 | 0 | L | H | 1 |
| 1 | 1 | 1 | L | H | 1 |
| 0 | 0 | 0 | H | L | 0 |
| 0 | 0 | 1 | H | L | 0 |
| 0 | 1 | 0 | H | L | 0 |
| 0 | 1 | 1 | L | H | 1 |

ARITHMETIC DEVICES WITH LOOK-UP TABLE FOR NEURAL NETWORK

CROSS-REFERENCE TO RELATED APPLICATIONS

This application is a continuation-in-part of U.S. patent application Ser. No. 16/932,400, filed on Jul. 17, 2020, which is a continuation-in-part of U.S. patent application Ser. No. 16/919,786, filed on Jul. 2, 2020, which claims priority under 35 U.S.C 119(a) to Korean Application No. 10-2019-0138114, filed on Oct. 31, 2019, Korean Application No. 10-2019-0160238, filed on Dec. 4, 2019, Provisional Patent Application No. 62/958,614, filed on Jan. 8, 2020, Provisional Patent Application No. 62/958,609, filed on Jan. 8, 2020, Provisional Patent Application No. 62/959,574, filed on Jan. 10, 2020, and Provisional Patent Application No. 62/959,593, filed on Jan. 10, 2020, which is incorporated herein by reference in its entirety.

BACKGROUND

1. Technical Field

Embodiments of the present disclosure generally relate to arithmetic devices for a neural network.

2. Related Art

In a neural network, neurons mathematically modelled to resemble to a human brain are connected to each other to form a network. Recently, neural network technologies have been developed fast. Accordingly, a lot of effort has been focused on analyzing input data and extracting useful information by using the neural network technologies in various electronic devices.

SUMMARY

According to an embodiment, an arithmetic device includes a multiplying-accumulating (MAC) operator and an activation function (AF) circuit. The MAC operator is configured to perform a MAC arithmetic operation for weight data and vector data to generate an arithmetic result signal. The AF circuit is configured to extract a first bit group and a second bit group from the arithmetic result signal, configured to generate an input distribution signal based on the first bit group and the second bit group, and configured to select and output an output distribution signal that corresponds to the input distribution signal based on an activation function.

According to another embodiment, an arithmetic device includes a bit group selector, a correction code generator, an input distribution signal generator, and an output distribution signal generator. The bit group selector is configured to extract a first bit group and a second bit group from an arithmetic result signal generated by a multiplying-accumulating (MAC) arithmetic operation to output the first bit group and the second bit group. The correction code generator is configured to generate a correction code based on the second bit group. The input distribution signal generator is configured to add the correction code to the first bit group to generate an input distribution signal. The output distribution signal generator is configured to select and output an output distribution signal that corresponds to the input distribution signal based on an activation function.

According to yet another embodiment, an arithmetic device includes a bit group selector configured to extract a first bit group and a second bit group from an arithmetic result signal generated by a multiplying-accumulating (MAC) arithmetic operation to output the first bit group and the second bit group, a correction code generator configured to generate a correction code based on the first bit group and the second bit group, an input distribution signal generator configured to add the correction code to the first bit group to generate an input distribution signal, and an output distribution signal generator configured to select and output an output distribution signal that corresponds to the input distribution signal based on an activation function.

BRIEF DESCRIPTION OF THE DRAWINGS

FIG. 14 is a table, illustrating an operation of the output distribution signal generation circuit, shown in FIG. 13.

FIG. 19 illustrates various activation functions, applicable to an activation function (AF) circuit, included in the arithmetic device of FIG. 17.

FIG. 20 is a table, illustrating an example of a look-up table for realizing a hyperbolic tangent (Tank) activation function, illustrated in FIG. 19.

FIG. 21 is a table, illustrating an example of a look-up table for realizing an activation function, applied to an AF circuit that is included in the arithmetic device of FIG. 17.

FIGS. 23 and 24 are tables, illustrating operations for selecting a first bit group and a second bit group from an arithmetic result signal in the AF circuit of FIG. 22.

FIG. 26 is a table, illustrating an operation of the correction code generator, illustrated in FIG. 25.

FIGS. 27 to 30 illustrate an operation of an AF circuit including the correction code generator of FIG. 25.

FIG. 31 is a table, illustrating an operation of another example of the correction code generator, included in the AF circuit of FIG. 22.

FIGS. 32 to 34 illustrate an operation of an AF circuit, including a correction code generator, described with reference to FIG. 31.

FIG. 36 is a table, illustrating an operation of a correction code generator, included in the AF circuit of FIG. 35.

DETAILED DESCRIPTION

In the following description of the embodiments, when a parameter is referred to as being "predetermined", it may be intended to mean that a value of the parameter is determined in advance when the parameter is used in a process or an algorithm. The value of the parameter may be set when the process or the algorithm starts or may be set during a period that the process or the algorithm is executed.

It will be understood that although the terms "first", "second", "third" etc. are used herein to describe various elements, these elements should not be limited by these terms. These terms are only used to distinguish one element from another element. Thus, a first element in some embodiments could be termed a second element in other embodiments without departing from the teachings of the present disclosure.

Further, it will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

A logic "high" level and a logic "low" level may be used to describe logic levels of electric signals. A signal with a logic "high" level may be distinguished from a signal with a logic "low" level. For example, when a signal with a first voltage correspond to a signal with a logic "high" level, a signal with a second voltage correspond to a signal with a logic "low" level. In an embodiment, the logic "high" level may be set as a voltage level which is higher than a voltage level of the logic "low" level. Meanwhile, logic levels of signals may be set to be different or opposite according to the embodiments. For example, a certain signal with a logic "high" level in one embodiment may be set to have a logic "low" level in another embodiment.

Various embodiments of the present disclosure will be described hereinafter with reference to the accompanying drawings. However, the embodiments described herein are for illustrative purposes only and are not intended to limit the scope of the present disclosure.

Figure 1:
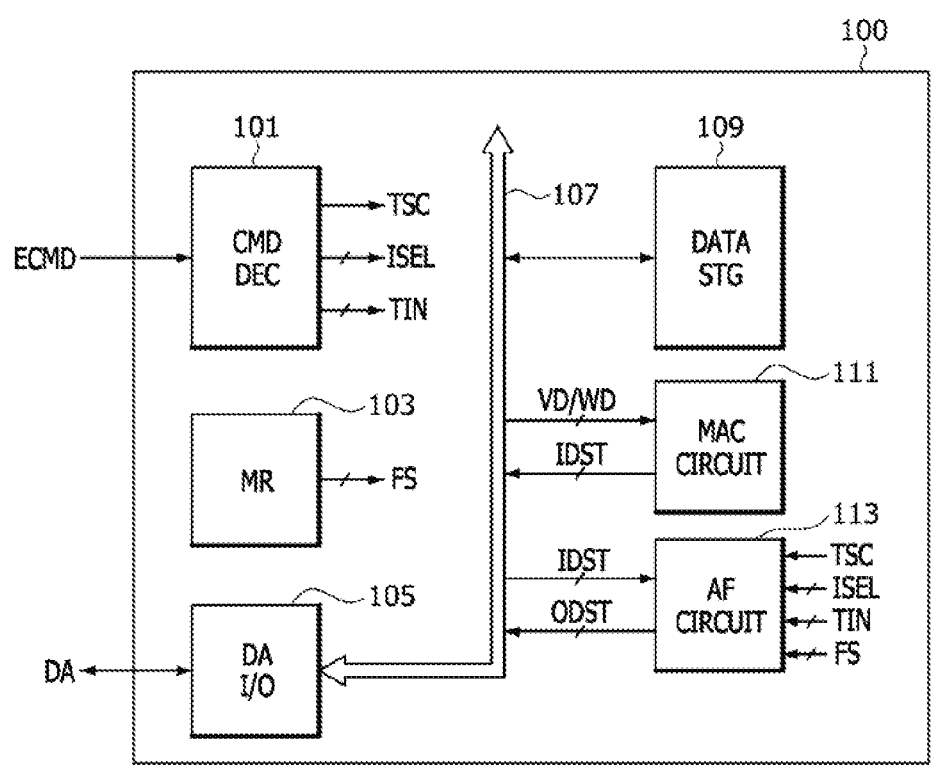
FIG. 1 is a block diagram, illustrating a configuration of an arithmetic device, according to an embodiment of the present disclosure.

As illustrated in FIG. 1, an arithmetic device 13 may include command decoder 101, a mode register 103, a data input/output (I/O) circuit 105, a data line 107, a data storage circuit 109, a MAC circuit 111 and an AF circuit 113.

The command decoder 101 may generate a table set signal TSC, an input selection signal ISEL, and a table input signal TIN based on an external command ECMD. The number of bits included in the input selection signal ISEL may be set to be different according to the embodiments. The number of bits included in the table input signal TIN may be set to be different according to the embodiments.

The command decoder 101 may decode external command ECMD to generate the table set signal TSC. The table set signal TSC may be activated to store an activation function used for a neural network into a first table storage circuit (133 of FIG. 3) in a look-up table form. The number of bits included in the external command ECMD for activating the table set signal TSC may be set to be different according to the embodiments. In addition, a logic level combination of the external command ECMD for activating the table set signal TSC may be set to be different according to the embodiments. The lookup table has a table form that contains information about an input value and the output value corresponding to the input value. When by using the lookup table, the output value corresponding to the input value can be printed directly without any arithmetic, thus improving the arithmetic speed.

The command decoder 101 may decode the external command ECMD to generate the input selection signal ISEL and the table input signal TIN. The input selection signal ISEL and the table input signal TIN may be generated to store the activation function into first to $N^{th}$ variable latches (149_1~149_N of FIG. 4) included in the first table storage circuit (133 of FIG. 3) in a look-up table form. The table input signal TIN may be stored in one variable latch selected by the input selection signal ISEL among the first to $N^{th}$ variable latches (149_1~149_N of FIG. 4). A logic level combination of the external command ECMD for setting logic level combinations of the table input signal TIN may be set to be different based on the embodiments. A logic level combination of the external command ECMD for setting logic level combinations of the input selection signal ISEL may be set to be different based on the embodiments.

The mode register 103 may store a function selection signal FS through a mode register set. The mode register 103 may output the function selection signal FS through a mode register read. The mode register set and the mode register read are common operations for the mode register 139, so the specific description is omitted. The mode register 103 may apply the function selection signal FS to the AF circuit 113. The function selection signal FS may be generated to select one of various activation functions which are used for a neural network. The various activation functions used for a neural network may include, but are not limited to, sigmoid sigmoid function), Tan h (i.e., hyperbolic tangent activation function), ReLU (i.e., rectified linear unit function), leaky ReLU (i.e., leaky rectified linear unit function), Maxout (i.e., max out activation function), and an activation function which is inputted based on the external command ECMD. The number of bits included in the function selection signal FS may be set to be different according to the embodiments. The mode register 103 can be located on the external side of the arithmetic device 13, for example, on a host or a memory controller.

The data input/output circuit 105 may receive external data DA from the external side of the arithmetic device 13, and transmit the external data DA to at least one of the data storage circuit 109 and the MAC circuit 111 through the data line 107. The data input/output circuit 105 may output data from at least one of the data storage circuit 109, the MAC circuit 111 and the AF circuit 113 through the data line 107 to the external data DA.

The data storage circuit 109 may be stored internally by receiving the external data DA received from the data input/output circuit 105 through the data line 107 in a write operation. The data storage circuit 109 may transmit the data stored internally to the data input/output circuit 105 through the data line 107 and output it to the external data DA in read operation.

The MAC circuit 111 may receive vector data VD and weight data WD. The MAC circuit 111 may receive the vector data VD from the data input/output circuit 105 or data storage circuit 109. The MAC circuit 111 may receive the weight data WD from the data input/output circuit 105 or data storage circuit 109. The MAC circuit 111 may perform MAC arithmetic operation on the vector data VD and the weight data WD, and generate an input distribution signal IDST based on the results of MAC arithmetic operation.

The MAC arithmetic operation may include a multiplying operation and an accumulating operation for the vector data VD and the weight data WD. When the vector data VD and the weight data WD are implemented in matrix format, the MAC arithmetic operations may include multiple multiplying operations and multiple accumulating operations for elements contained in matrix with the vector data VD implemented and elements contained in matrix with the weight data WD implemented. In the neural network, the MAC arithmetic operations are performed to classify features contained in an input layer into resulting values contained in an output layer. The vector data VD may contain information about features contained in the Input layer. The weight data WD may contain information about the influence on classifying features of the input layers as results contained in the output layers. The MAC circuit 111 may receive an output distribution signal ODST from the AF circuit 113 as the vector data VD when multiple layers are applied in perceptron.

The AF circuit 113 may store the activation functions used for a neural network into the first table storage circuit (133 of FIG. 3) in a look-up table form, based on the table set signal TSC, the input selection signal ISEL, and the table input signal TIN. The lookup table stored in the AF circuit 113 includes information on the relationship between the input distribution signal IDST and the output distribution signal ODST. The output distribution signal ODST can be defined as the value derived when the input distribution signal IDST is applied to an activation function. The AF circuit 113 may store the table input signal TIN into one variable latch selected by the input selection signal ISEL among the first to $N^{th}$ variable latches (149_1~149_N of FIG. 4) when the table set signal TSC is activated. Various activation functions used for a neural network, for example, sigmoid, Tan h, ReLU, leaky ReLU, and Maxout may be hardwired into the AF circuit 113. The number of the activation functions hardwired in the AF circuit 113 may be set to be different according to the embodiments.

The AF circuit 113 may select one of the various activation functions based on the function selection signal FS. The AF circuit 113 may generate a result value provided by an activation function selected by the function selection signal FS based on the input distribution signal IDST. The AF circuit 113 may extract a result value corresponding to the input distribution signal IDST from a look-up table to which an activation function selected by the function selection signal FS is applied, thereby outputting the result value as an output distribution signal ODST. A configuration and an operation of the AF circuit 113 will be described with reference to FIGS. 3 to 7.

Figure 2:
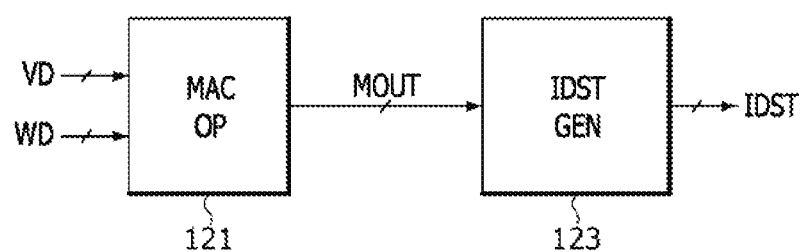
FIG. 2 is a block diagram, illustrating a configuration of a MAC circuit, included in the arithmetic device of FIG. 1.

Referring to FIG. 2, the MAC circuit 111 may include an MAC operator 121 and an input distribution signal generation circuit 123. The MAC operator 121 may receive the vector data VD and the weight data WD and may perform the MAC arithmetic operation including a multiplying operation and an accumulating operation to generate an arithmetic result signal MOUT. The input distribution signal generation circuit 123 may extract only some bits among bits of the arithmetic result signal MOUT to generate the input distribution signal IDST. For example, when the arithmetic result signal MOUT contains bits corresponding to the integer and bits corresponding to the decimal part, the input distribution signal IDST can be selected as the bits corresponding to the integer from among the bits contained in the arithmetic result signal MOUT. The number of bits of the arithmetic result signal MOUT may be set to be different according to the embodiments. In addition, the number of bits of the input distribution signal IDST may also be set to be different according to the embodiments. The number of bits of the input distribution signal IDST may be set to be less than the number of bits of the arithmetic result signal MOUT.

Figure 3:
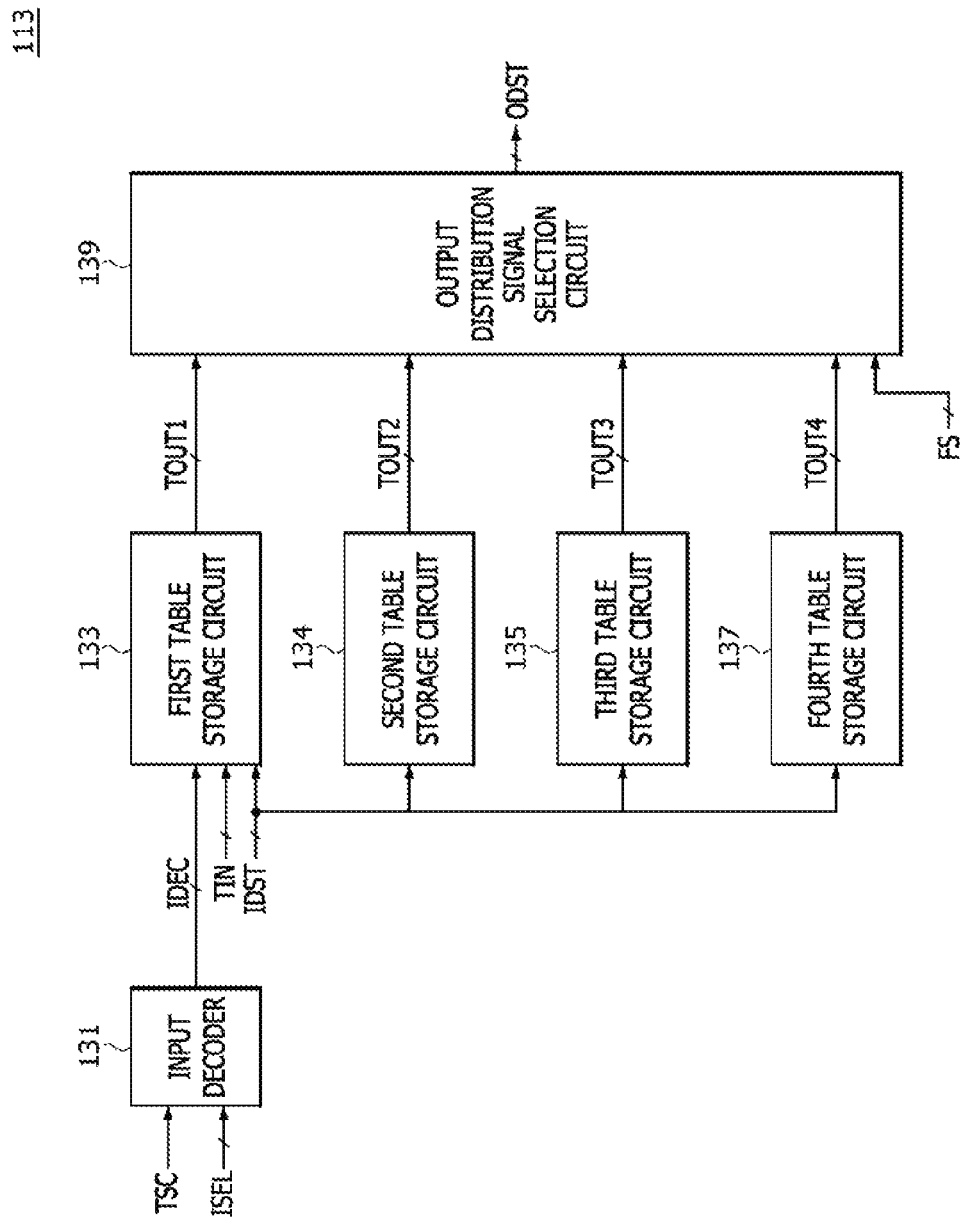
FIG. 3 is a block diagram, illustrating a configuration of an AF circuit, included in the arithmetic device of FIG. 1.

Referring to FIG. 3, the AF circuit 113 may include an input decoder 131, the first table storage circuit 133, a second table storage circuit 134, a third table storage circuit 135, a fourth table storage circuit 137, and an output distribution signal selection circuit 139.

The input decoder 131 may generate a decoded input signal IDEC based on the table set signal TSC and the input selection signal ISEL. The input decoder 131 may decode the input selection signal ISEL to generate the decoded input signal IDEC when the table set signal TSC is activated.

The first table storage circuit 133 may store the table input signal TIN and may output a first table output signal TOUT1, based on the decoded input signal IDEC and the input distribution signal IDST. The first table storage circuit 133 may store the table input signal TIN as a first activation function with a look-up table form based on the decoded input signal IDEC. The first table storage circuit 133 may output a result value of the first activation function as the first table output signal TOUT1 based on the input distribution signal IDST. A configuration and an operation of the first table storage circuit 133 will be described with reference to FIGS. 4 to 6.

A second activation function may be hardwired into the second table storage circuit 134. The second table storage circuit 134 may include logic circuits implemented in hardware with the second activation function. The second activation function may be set as one of sigmoid, Tan h, ReLU, leaky ReLU, and Maxout. The second table storage circuit 134 may output a result value of the second activation function stored in a look-up table form as a second table output signal TOUT2 based on the input distribution signal IDST. A configuration and an operation of the second table storage circuit 134 will be described with reference to FIG. 7.

A third activation function may be hardwired into the third table storage circuit 135. The third table storage circuit 135 may include logic circuits implemented in hardware with the third activation function. The third activation function may be set as one of sigmoid, Tan h, ReLU, leaky ReLU, and Maxout. The third activation function may be set to be different from the second activation function. The third table storage circuit 135 may output a result value of the third activation function stored in a look-up table form as a third table output signal TOUT3 based on the input distribution signal IDST.

A fourth activation function may be hardwired into the fourth table storage circuit 137. The fourth table storage circuit 137 may include logic circuits implemented in hardware with the fourth activation function. The fourth activation function may be set as one of sigmoid, Tan h, ReLU, leaky ReLU, and Maxout. The fourth activation function may be set to be different from the second and third activation functions. The fourth table storage circuit 137 may output a result value of the fourth activation function stored in a look-up table form as a fourth table output signal TOUT4 based on the input distribution signal IDST.

The output distribution signal selection circuit 139 may generate the output distribution signal ODST from the first table output signal TOUT1, the second table output signal TOUT2, the third table output signal TOUT3, and the fourth table output signal TOUT4 based on the function selection signal FS. The output distribution signal selection circuit 139 may output the first table output signal TOUT1 as the output distribution signal ODST when the function selection signal FS has a first logic level combination. The output distribution signal selection circuit 139 may output the second table output signal TOUT2 as the output distribution signal ODST when the function selection signal FS has a second logic level combination. The output distribution signal selection circuit 139 may output the third table output signal TOUT3 as the output distribution signal ODST when the function selection signal FS has a third logic level combination. The output distribution signal selection circuit 139 may output the fourth table output signal TOUT4 as the output distribution signal ODST when the function selection signal FS has a fourth logic level combination.

Figure 4:
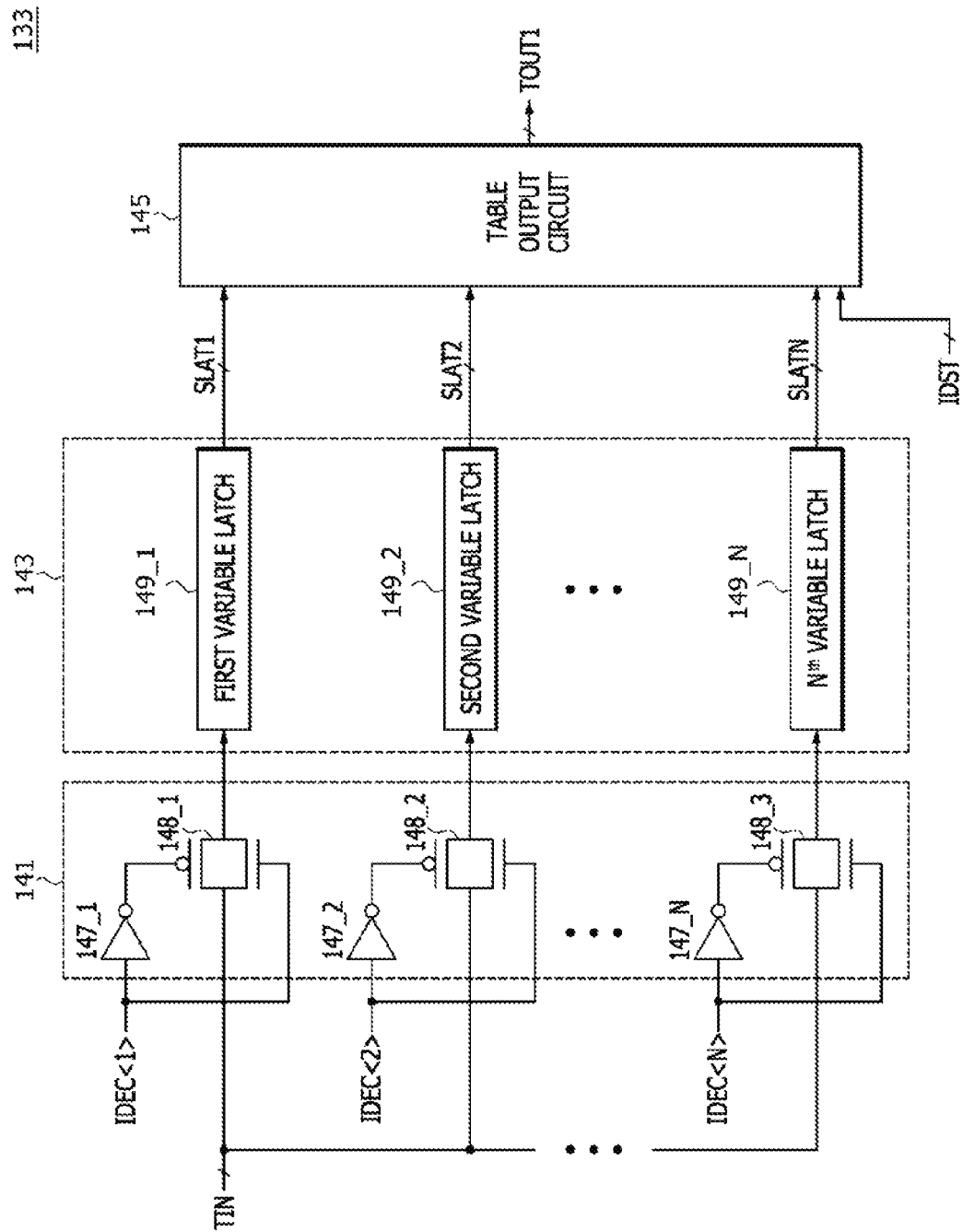
FIG. 4 illustrates a configuration of a first table storage circuit included in the AF circuit of FIG. 3.

Referring to FIG. 4, the first table storage circuit 133 may include a decoded signal input circuit 141, a variable latch circuit 143, and a table output circuit 145.

The decoded signal input circuit 141 may include inverters 147_1~147_N and transfer gates 148_1~148_N. The inverter 147_1 may inversely buffer a first bit signal of the decoded input signal IDEC<1> to output the inversely buffered signal of the first bit signal of the decoded input signal IDEC<1>. The inverter 147_2 may inversely buffer a second bit signal of the decoded input signal IDEC<2> to output the inversely buffered signal of the second bit signal of the decoded input signal IDEC<2>. The inverter 147_N may inversely buffer an $N^{th}$ bit signal of the decoded input signal IDEC<N> to output the inversely buffered signal of the $N^{th}$ bit signal of the decoded input signal IDEC<N>. The transfer gate 148_1 may be turned on to transfer the table input signal TIN to a first variable latch 149_1 when the first bit signal of the decoded input signal IDEC<1> has a logic "high" level. The transfer gate 148_2 may be turned on to transfer the table input signal TIN to a second variable latch 149_2 when the second bit signal of the decoded input signal IDEC<2> has a logic "high" level. The transfer gate 148_N may be turned on to transfer the table input signal TIN to an $N^{th}$ variable latch 149_N when the $N^{th}$ bit signal of the decoded input signal IDEC<N> has a logic "high" level.

The decoded signal input circuit 141 may transfer the table input signal TIN to the first to $N^{th}$ variable latches 149_1~149_N included in the variable latch circuit 143 based on the decoded input signal IDEC. The decoded signal input circuit 141 may receive the table input signal TIN through a path selected by the decoded input signal IDEC to transfer the table input signal TIN to the first to $N^{th}$ variable latches 149_1~149_N included in the variable latch circuit 143.

The variable latch circuit 143 may include the first to $N^{th}$ variable latches 149_1~149_N. The first variable latch 149_1 may receive and store the table input signal TIN through the transfer gate 148_1 turned on when the first bit signal IDEC<1> of the decoded input signal IDEC has a logic "high" level and may output the stored table input signal TIN as a first variable latch signal SLAT1. The second variable latch 149_2 may receive and store the table input signal TIN through the transfer gate 148_2 turned on when the second bit signal IDEC<2> of the decoded input signal IDEC has a logic "high" level and may output the stored table input signal TIN as a second variable latch signal SLAT2. The $N^{th}$ variable latch 149_N may receive and store the table input signal TIN through the transfer gate 148_N turned on when the $N^{th}$ bit signal IDEC<N> of the decoded input signal IDEC has a logic "high" level and may output the stored table input signal TIN as an $N^{th}$ variable latch signal SLATN.

The table output circuit 145 may select one of the first to $N^{th}$ variable latch signals SLAT1~SLATN as a result value of the activation function based on the input distribution signal IDST, thereby outputting the selected variable latch signal as the first table output signal TOUT1. The table output circuit 145 may be realized to select one of the first to $N^{th}$ variable latch signals SLAT1~SLATN as the first table output signal TOUT1 based on a logic level combination of the input distribution signal IDST or based on a decoded signal of the input distribution signal IDST. A configuration and an operation of the table output circuit 145 will be described with reference to FIGS. 5 and 6.

Figure 5:
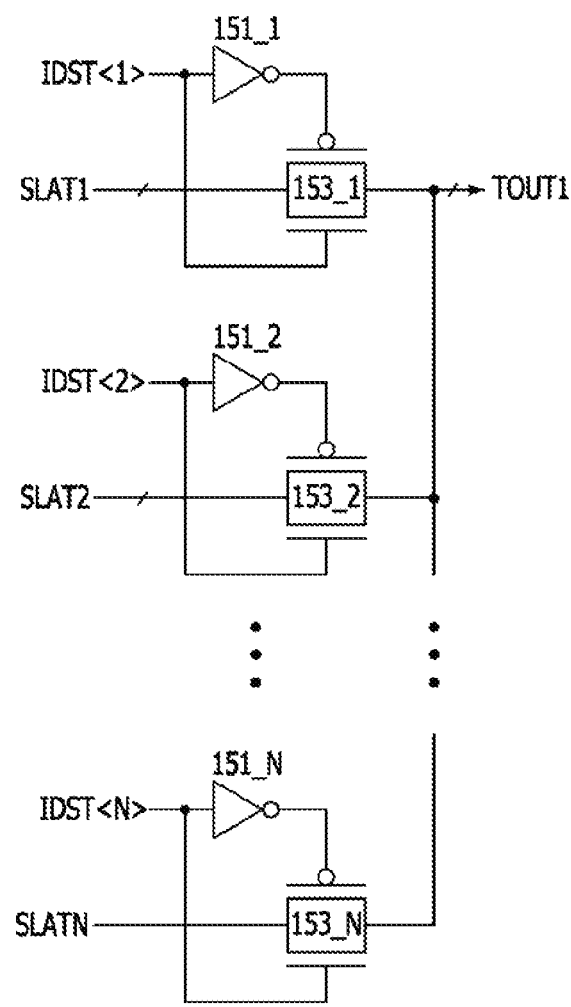
FIGS. 5 and 6 are circuit diagrams, illustrating examples of a table output circuit, included in the first table storage circuit of FIG. 4.

Referring to FIG. 5, a table output circuit 145a corresponding to an example of the table output circuit 145 may include inverters 151_1, 151_2, ..., and 151_N and transfer gates 153_1, 153_2, ..., and 153_N. The inverter 151_1 may inversely buffer a first bit signal of the input distribution signal IDST<1> to output the inversely buffered signal of the first bit signal of the input distribution signal IDST<1>. The inverter 151 . . . 2 may inversely buffer a second bit signal of the input distribution signal IDST<2> to output the inversely buffered signal of the second bit signal of the input distribution signal IDST<2>. The inverter 151_N may inversely buffer an $N^{th}$ bit signal of the input distribution signal IDST<N> to output the inversely buffered signal of the $N^{th}$ bit signal of the input distribution signal IDST<N>. The transfer gate 153_1 may be turned on to output the first variable latch signal SLAT1 as the first table output signal TOUT1 when the first bit signal of the input distribution signal IDST<1> has a logic "high" level. The transfer gate 153_2 may be turned on to output the second variable latch signal SLAT2 as the first table output signal TOUT1 when the second bit signal of the input distribution signal IDST<2> has a logic "high" level. The transfer gate 153_N may be turned on to output the $N^{th}$ variable latch signal SLATN as the first table output signal TOUT1 when the $N^{th}$ bit signal of the input distribution signal IDST<N> has a logic "high" level.

Figure 6:
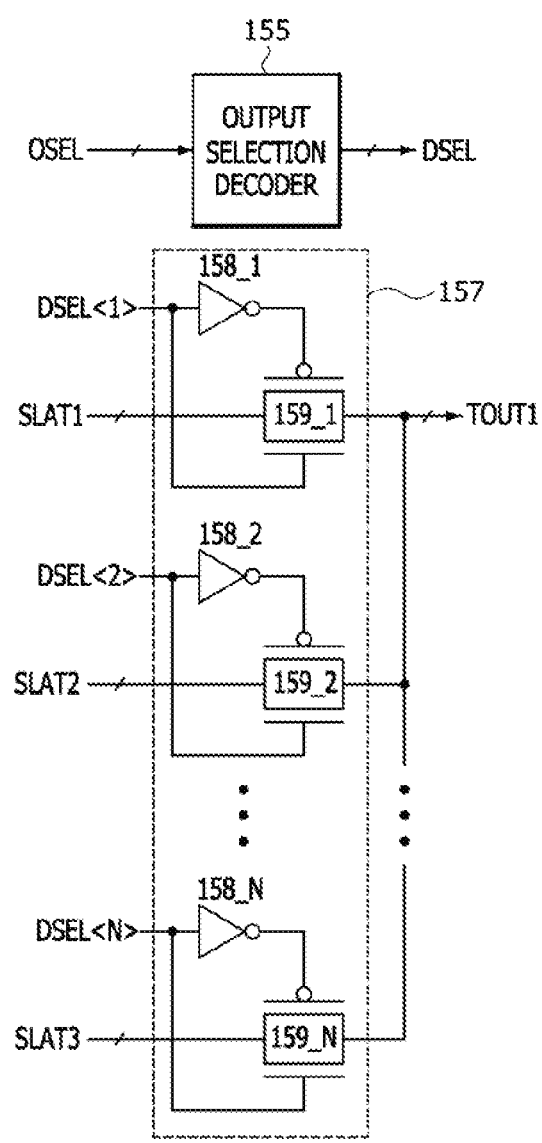

Referring to FIG. 6, a table output circuit 145b corresponding to another example of the table output circuit 145 may include an output selection decoder 155 and a decoded signal output circuit 157. The output selection decoder 155 may decode the input distribution signal IDST to generate a decoded selection signal DSEL. The decoded signal output circuit 157 may include inverters 158_1, 158_2, . . . , and 158_N and transfer gates 159_1, 159_2, . . . , and 159_N. The inverter 158_1 may inversely buffer a first bit signal of the decoded selection signal DSEL<1> to output the inversely buffered signal of the first bit signal of the decoded selection signal DSEL<1>. The inverter 158_2 may inversely buffer a second bit signal of the decoded selection signal DSEL<2> to output the inversely buffered signal of the second bit signal of the decoded selection signal DSEL<2>. The inverter 158_N may inversely buffer an $N^{th}$ bit signal of the decoded selection signal DSEL<N> to output the inversely buffered signal of the $N^{th}$ bit signal of the decoded selection signal DSEL<N>. The transfer gate 159_1 may be turned on to output the first variable latch signal SLAT1 as the first table output signal TOUT1 when the first bit signal of the decoded selection signal DSEL<1> has a logic "high" level. The transfer gate 159_2 may be turned on to output the second variable latch signal SLAT2 as the first table output signal TOUT1 when the second bit signal of the decoded selection signal DSEL<2> has a logic "high" level. The transfer gate 159_N may be turned on to output the $N^{th}$ variable latch signal SLATN as the first table output signal TOUT1 when the $N^{th}$ bit signal of the decoded selection signal DSEL<N> has a logic "high" level.

Figure 7:
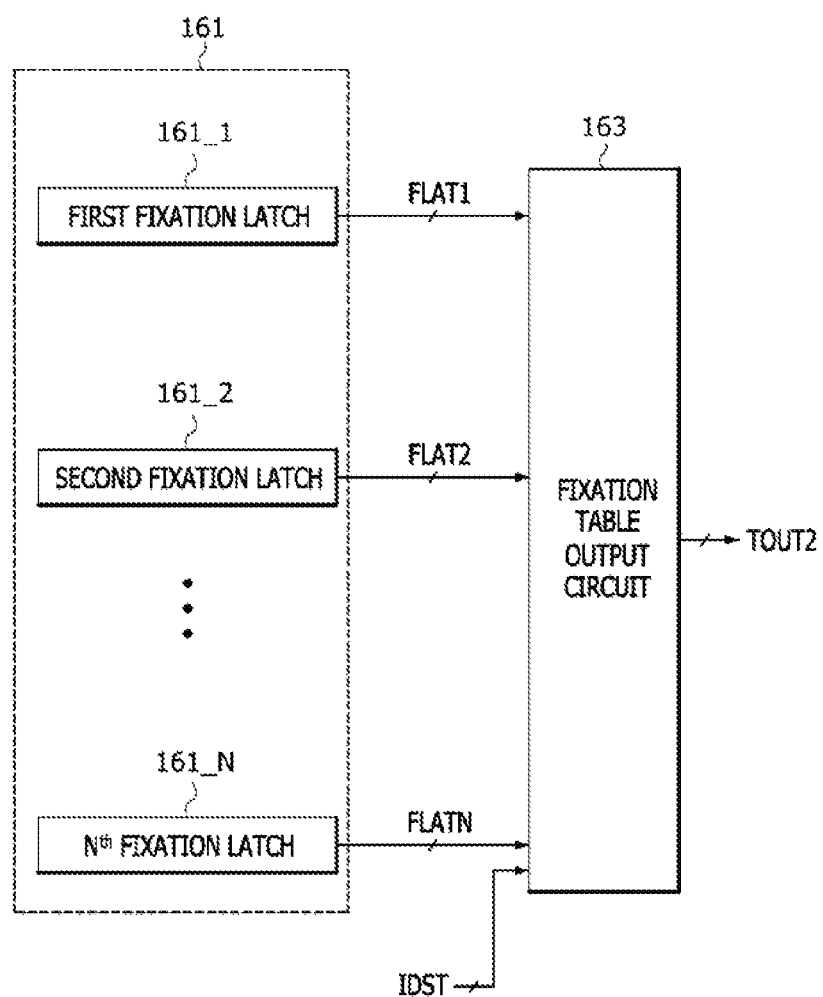
FIG. 7 is a block diagram, illustrating a configuration of a second table storage circuit, included in the AF circuit of FIG. 3.

Referring to FIG. 7, the second table storage circuit 134 may include a fixation latch circuit 161 and a fixation table output circuit 163. The fixation latch circuit 161 may include first to $N^{th}$ fixation latches 161_1~161_N. A first fixation latch signal FLAT1 may be hardwired in the first fixation latch 161_1 as a hardware. A second fixation latch signal FLAT2 may be hardwired in the second fixation latch 161_2 as a hardware. An $N^{th}$ fixation latch signal FLATN may be hardwired in the $N^{th}$ fixation latch 161_N as a hardware. Each of the first to $N^{th}$ fixation latch signals FLAT1~FLATN stored in the first to $N^{th}$ fixation latches 161_1~161_N may be a result value for storing one of sigmoid, Tan h, ReLU, leaky ReLU, and Maxout in a look-up table form. Logic level combinations of the input distribution signal IDST may be set to correspond to the first to $N^{th}$ fixation latch signals FLAT1~FLATN, respectively. The fixation table output circuit 163 may select one of the first to $N^{th}$ fixation latch signals FLAT1~FLATN as a result value of the activation function based on the input distribution signal IDST, thereby outputting the selected variable latch signal as the second table output signal TOUT2. Each of the third and fourth table storage circuits 25 and 26 illustrated in FIG. 3 may be realized to have the same configuration as the second table storage circuit 134 illustrated in FIG. 7.

The arithmetic device 100 with an aforementioned configuration may receive information on the activation function used for a neural network as a command and an address to store the information in a look-up table form. Thus, various activation functions set to be different from each other may be applied to the neural network without any design changes.

Figure 8:
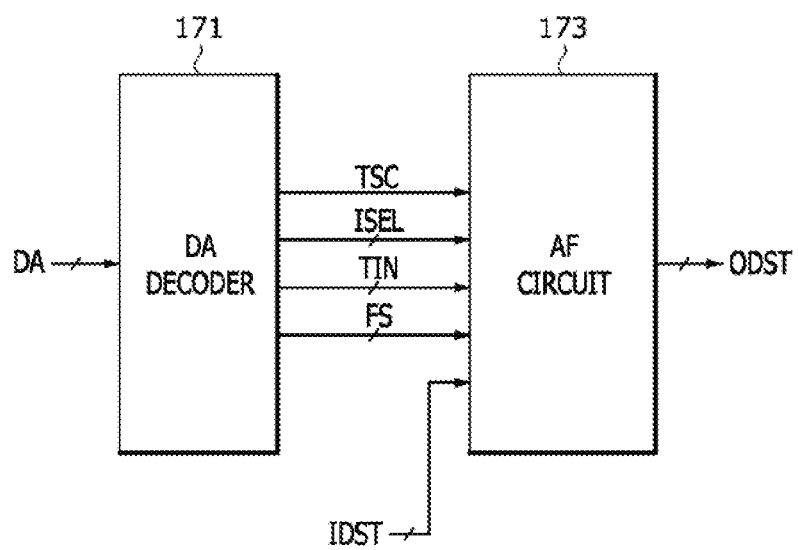
FIG. 8 is a block diagram, illustrating a configuration of an arithmetic device, according to another embodiment of the present disclosure.

Referring to FIG. 8, an arithmetic device 100a according to another embodiment may include an external data decoder 171 and an AF circuit 173.

The external data decoder 171 may receive external data DA to set and output a table set signal TSC, an input selection signal ISEL, a table input signal TIN, and a function selection signal FS. The external data decoder 171 may generate the table set signal TSC, the input selection signal ISEL, the table input signal TIN, and the function selection signal FS from the external data DA which are sequentially inputted to the external data decoder 171.

The AF circuit 173 may store activation functions used for a neural network in a look-up table form, based on the table set signal TSC, the input selection signal ISEL, and the table input signal TIN. Various activation functions may be hardwired in the AF circuit 173. The AF circuit 173 may output a result value of an activation function, which is selected by the function selection signal FS based on an input distribution signal IDST, as an output distribution signal ODST. A configuration and an operation of the AF circuit 173 may be the same as a configuration and an operation of the AF circuit 113 illustrated in FIG. 1. Thus, descriptions of the AF circuit 173 will be omitted hereinafter.

The arithmetic device 100a with the aforementioned configurations may receive information on the activation function used for a neural network as data to store the information in a look-up table form. Thus, various activation functions set to be different from each other may be applied to the neural network without any design changes.

Figure 9:
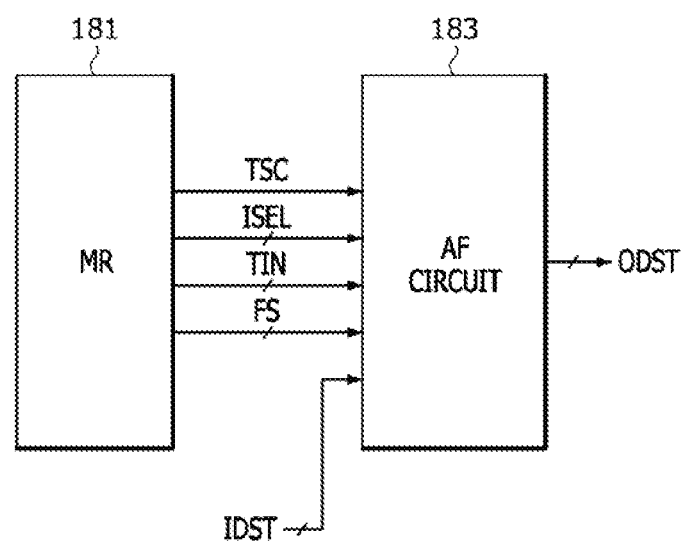
FIG. 9 is a block diagram, illustrating a configuration of an arithmetic device, according to still another embodiment of the present disclosure.

Referring to FIG. 9, an arithmetic device 100b according to still another embodiment may include a mode register 181 and an AF circuit 183.

The mode register 181 may store a table set signal TSC, an input selection signal ISEL, a table input signal TIN, and a function selection signal FS through a mode register set. The mode register 181 may output the table set signal TSC, the input selection signal ISEL, the table input signal TIN, and the function selection signal FS through a mode register read.

The AF circuit 183 may store activation functions used for a neural network in a look-up table form, based on the table set signal TSC, the input selection signal ISEL, and the table input signal TIN. Various activation functions may be hardwired in the AF circuit 183. The AF circuit 183 may output a result value of an activation function, which is selected by the function selection signal FS based on an input distribution signal IDST, as an output distribution signal ODST. A configuration and an operation of the AF circuit 183 may be the same as a configuration and an operation of the AF circuit 113 illustrated in FIG. 1. Thus, descriptions of the AF circuit 183 will be omitted hereinafter.

The arithmetic device 100b with the aforementioned configurations may store information on the activation function used for a neural network in a look-up table form based on information stored in the mode register 181. Thus, various activation functions set to be different from each other may be applied to the neural network without any design changes.

The arithmetic device 100 illustrated in FIG. 1, the arithmetic device 100a illustrated in FIG. 8, and the arithmetic device 100b illustrated in FIG. 9 can be included in memory modules that receive the external command through hosts and memory controllers. Memory modules can be implemented as single in-line memory module (SIMM), dual inline memory module (DIMM), and high bandwidth memory (HBM).

Figure 10:
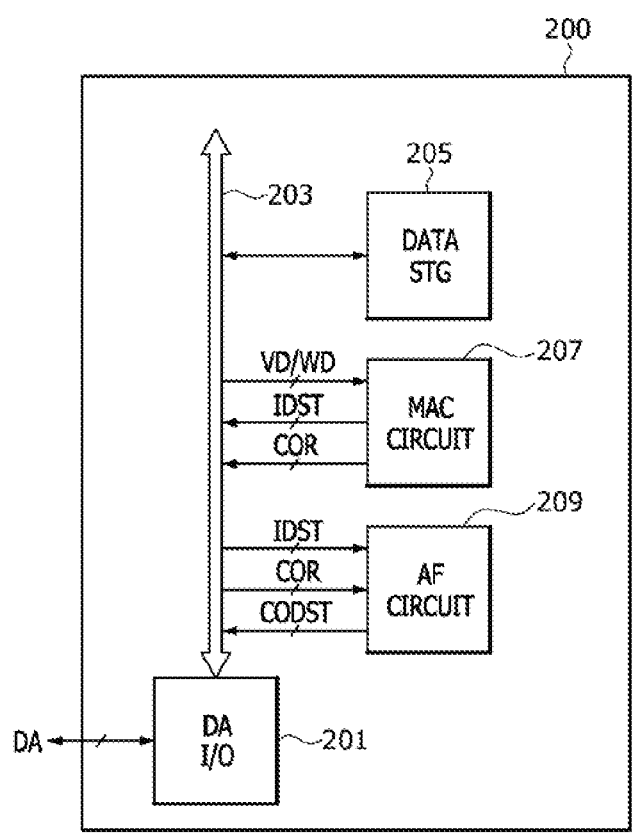
FIG. 10 is a block diagram, illustrating a configuration of an arithmetic device, according to still another embodiment of the present disclosure.

As illustrated in FIG. 10, an arithmetic device 200 may include a data input/output circuit 201, a data line 203, a data storage circuit 205, a MAC circuit 207 and an AF circuit 209.

The data input/output circuit 201 may receive external data DA from the external side of the arithmetic device 13, and transmit the external data DA to at least one of the data storage circuit 205 and the MAC circuit 207 through the data line 203. The data input/output circuit 201 may output data from at least one of the data storage circuit 205, the MAC circuit 207 and the AF circuit 209 through the data line 203 to the external data DA.

The data storage circuit 205 may be stored internally by receiving the external data DA received from the data input/output circuit 201 through the data line 203 in a write operation. The data storage circuit 205 may transmit the data stored internally to the data input/output circuit 201 through the data line 203 and output it to the external data DA in a read operation.

The MAC circuit 207 may receive vector data VD and weight data WD. The MAC circuit 207 may receive the vector data VD from the data input/output circuit 201 or data storage circuit 205. The MAC circuit 207 may receive the weight data WD from the data input/output circuit 201 or data storage circuit 205. The MAC circuit 207 may perform MAC arithmetic operation on the vector data VD and the weight data WD, and generate an input distribution signal IDST and a compensation signal COR based on the results of MAC arithmetic operation. The MAC circuit 207 may receive a compensated distribution signal CODST from the AF circuit 209 as the vector data VD when multiple layers are applied in perceptron.

The AF circuit 209 may store the activation functions used for a neural network in a look-up table form. The lookup table stored in the AF circuit 209 includes information on the relationship between the input distribution signal IDST and the output distribution signal ODST. The output distribution signal ODST can be defined as the value derived when the input distribution signal IDST is applied to an activation function. Various activation functions used for a neural network, for example, sigmoid, Tan h, ReLU, leaky ReLU, and Maxout may be hardwired into the AF circuit 209. The number of the activation functions hardwired in the AF circuit 209 may be set to be different according to the embodiments.

The AF circuit 209 may generate the compensated distribution signal CODST based on the input distribution signal IDST and the compensation signal COR. The AF circuit 209 may generate a first output distribution signal ODST1 and a second output distribution signal ODST2 based on the input distribution signal IDST by using the internally stored activation function. The AF circuit 209 may generate the compensated distribution signal CODST by compensating the first output distribution signal ODST1 based on the compensation signal COR, the first output distribution signal ODST1 and the second output distribution signal ODST2.

Figure 11:
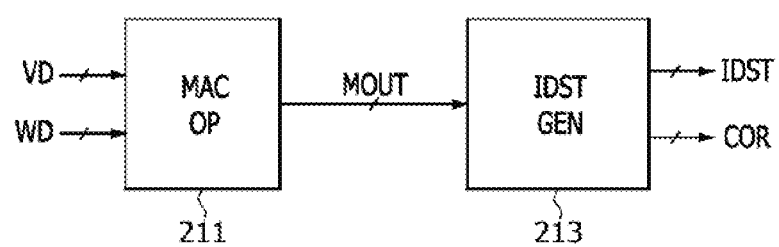
FIG. 11 is a block diagram, illustrating a configuration of a MAC circuit, included in the arithmetic device of FIG. 10.

Referring to FIG. 11, the MAC circuit 207 may include an MAC operator 211 and an input distribution signal generation circuit 213. The MAC operator 211 may receive the vector data VD and the weight data WD and may perform the MAC arithmetic operation including a multiplying operation and an accumulating operation to generate an arithmetic result signal MOUT. The input distribution signal generation circuit 213 may extract only some bits among bits of the arithmetic result signal MOUT to generate the input distribution signal IDST and the compensation signal COR. For example, when the arithmetic result signal MOUT contains bits corresponding to the integer and bits corresponding to the decimal part, the input distribution signal IDST can be selected as the bits corresponding to the integer from among the bits contained in the arithmetic result signal MOUT, and the compensation signal COR can be selected as the bits corresponding to the integer from among the bits contained in the arithmetic result signal MOUT. The number of bits of the arithmetic result signal MOUT may be set to be different according to the embodiments. In addition, the number of bits of the input distribution signal IDST may also be set to be different according to the embodiments. The number of bits of the input distribution signal IDST may be set to be less than the number of bits of the arithmetic result signal MOUT.

Figure 12:
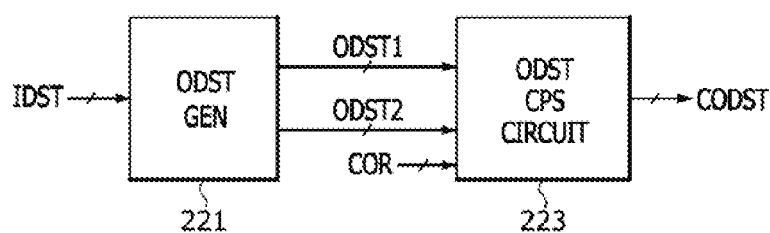
FIG. 12 is a block diagram, illustrating a configuration of an AF circuit, included in the arithmetic device of FIG. 10.

Referring to FIG. 12, the AF circuit 209 may include an output distribution signal generation circuit 221, and an output distribution signal compensation circuit 223.

The output distribution signal generation circuit 221 may generate a first output distribution signal ODST1 and a second output distribution signal ODST2 based on the input distribution signal IDST. The output distribution signal generation circuit 221 may store the activation function in a look-up table. The output distribution signal generation circuit 221 may apply the input distribution signal IDST to the activation function to generate the first output distribution signal ODST1. The output distribution signal generation circuit 221 may apply a value, the value obtained by adding a predetermined value to the input distribution signal IDST, to the activation function to generate the second output distribution signal ODST2.

The output distribution signal compensation circuit 223 may generate a compensated distribution signal CODST based on the first output distribution signal ODST1, the second output distribution signal ODST2, and the compensation signal COR, The output distribution signal compensation circuit 223 may generate the compensated distribution signal CODST by multiplying the value of the compensation signal COR and the value of the difference between the first output distribution signal ODST1 and the second output distribution signal ODST2. Since the output distribution signal compensation circuit 223 compensates for the first output distribution signal ODST1 based on the compensation signal COR to generate the compensated distribution signal CODST, accuracy of the activation function may be improved.

Figure 13:
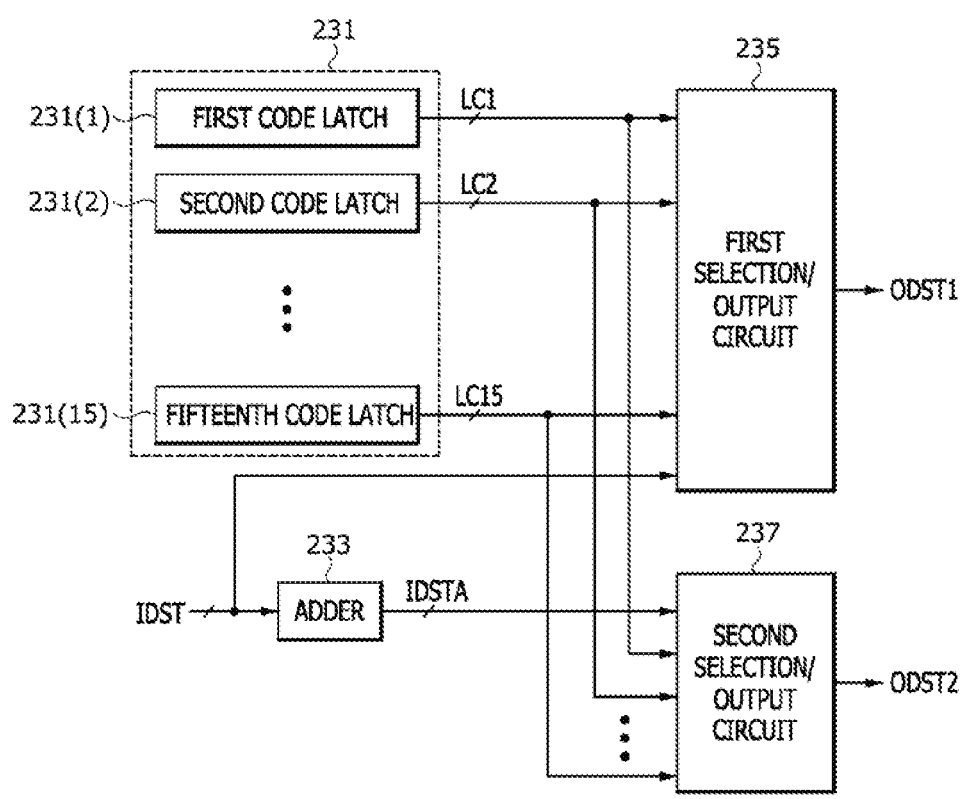
FIG. 13 is a block diagram, illustrating a configuration of an output distribution signal generation circuit, included in the AF circuit of FIG. 12.

As illustrated in FIG. 13, the output distribution signal generation circuit 221 may include a code latch circuit 231, an adder 233, a first selection/output circuit 235, and a second selection/output circuit 237.

The code latch circuit 231 may include a first to fifteenth code latches 231(1:15) and may store the activation function in a look-up table. The first code latch 231(1) may latch and output a first latch code LC1, the second code latch 231(2) may latch and output a second latch code LC2, and so on and so forth.

The adder 233 may add a predetermined value to the input distribution signal IDST to generate an added input distribution signal IDSTA. The adder 233 may add a binary number '1' to the input distribution signal IDST to generate the added input distribution signal IDSTA. For example, when the input distribution signal IDST<4:1> is set as a binary code of '1001', the added input distribution signal IDSTA<4:1> may be generated to have a binary code of '1010'. In some embodiments, the predetermined value added to the input distribution signal IDST may be set as the binary number of '10'.

The first selection/output circuit 235 may select and output one of the first to fifteenth latch codes LC1~LC15 as the first output distribution signal ODST1 based on the input distribution signal IDST. The first selection/output circuit 235 may select and output a code corresponding to a logic level combination of the input distribution signal IDST, among the first to fifteenth latch code LC1~LC15, as the first output distribution signal ODST1 based on the activation function.

The second selection/output circuit 237 may select and output one of the first to fifteenth latch code LC1~LC15 as the second output distribution signal ODST2 based on the added input distribution signal IDSTA. The second selection/output circuit 237 may select and output a code corresponding to a logic level combination of the added input distribution signal IDSTA, among the first to fifteenth latch code LC1~LC15, as the second output distribution signal ODST2 based on the activation function.

Referring to FIG. 14, set values of an output selection signal ODST, selected by logic level combinations of the input distribution signal IDST<4:1>, based on the activation function, are listed in a look-up table. The set value of the output selection signal ODST may be 'Y1' when the logic level combination of the input distribution signal IDST<4:1> has a binary number of '0001' (corresponding to a decimal number of '1'), and the set value of the output selection signal ODST may be 'Y2' when the logic level combination of the input distribution signal IDST<4:1> has a binary number of '0010' (corresponding to a decimal number of '2'). In addition, the set value of the output selection signal ODST may be 'Y9' when the logic level combination of the input distribution signal IDST<4:1> has a binary number of '1001' (corresponding to a decimal number of '9'), and the set value of the output selection signal ODST may be 'Y10' when the logic level combination of the input distribution signal IDST<4:1> has a binary number of '1010' (corresponding to a decimal number of '10'). Moreover, the set value of the output selection signal ODST may be 'Y15' when the logic level combination of the input distribution signal IDST<4:1> has a binary number of '1111' (corresponding to a decimal number of '15'). The value of 'Y1' may be a set value of the first latch code LC1, and the value of 'Y2' may be a set value of the second latch code LC2. In addition, the value of 'Y9' may be a set value of the ninth latch code LC9, and the value of 'Y10' may be a set value of the tenth latch code LC10. Moreover, the value of 'Y15' may be a set value of the fifteenth latch code LC15. When the logic level combination of the input distribution signal IDST<4:1> has a binary number of '1001' (corresponding to a decimal number of '9'), the added input distribution signal IDSTA<4:1>, outputted from the adder 233, may be set as a binary number of '1010'. In such a case, the first output distribution signal ODST1, outputted from the first selection/output circuit 235 based on the input distribution signal IDST<4:1>, may be 'Y9', and second output distribution signal ODST2, outputted from the second selection/output circuit 237 based on the added input distribution signal IDSTA<4:1>, may be 'Y10'. In this embodiment, the input distribution signal IDST contains 4 bits is only an example and is not limited to that. The combination of set values Y1-Y15 set by the output selection signal ODST and latch codes LC1-LC15 can vary depending on the number of bits contained in the input distribution signal IDST.

Figure 15:
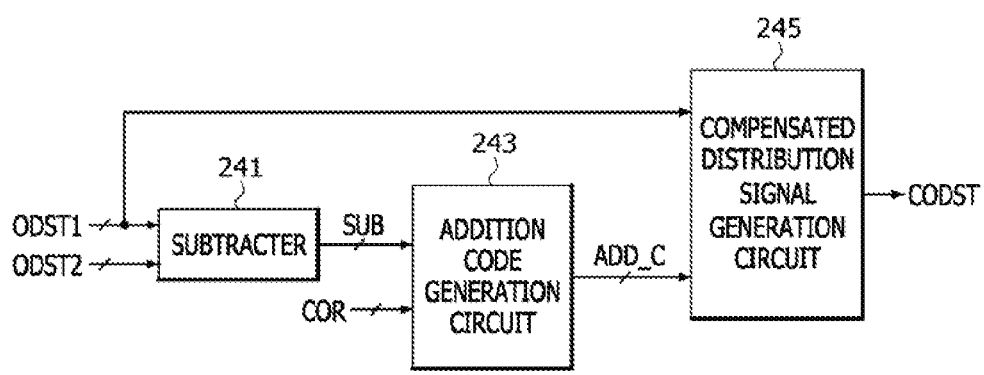
FIG. 15 is a block diagram, illustrating a configuration of an output distribution signal compensation circuit, included in the AF circuit of FIG. 12.

As illustrated in FIG. 15, the output distribution signal compensation circuit 223 may include a subtracter 241, an addition code generation circuit 243, and a compensated distribution signal generation circuit 245.

The subtracter 241 may subtract the first output distribution signal ODST1 from the second output distribution signal ODST2 to generate a subtraction code SUB. The subtraction code SUB may be generated to have a logic level combination corresponding to the difference between the first output distribution signal ODST1 and the second output distribution signal ODST2. For example, when the difference between the first output distribution signal ODST1 and the second output distribution signal ODST2 is a decimal number of '4', the subtraction code SUB may be generated to have a logic level combination corresponding to the binary number of '100'.

The addition code generation circuit 243 may generate an addition code ADD_C based on the subtraction code SUB and the compensation signal COR. The addition code generation circuit 243 may multiply the subtraction code SUB by a compensation value, is the compensation value being set by the compensation signal COR, to generate a subtraction/compensation value. The addition code generation circuit 243 may generate the addition code ADD_C with a logic level combination corresponding to an integer selected by the subtraction/compensation value. The compensation value set by the compensation signal COR may set the total number of logic level combinations of the compensation signal COR as its denominator and may set the value corresponding to a logic level combination of the compensation signal COR as its numerator. The addition code ADD_C may be set to have a logic level combination corresponding to an integer included in the subtraction/compensation value. For example, when the subtraction/compensation value has a value of '1.5', the addition code ADD_C may be set to have a logic level combination of '01', corresponding to an integer of '1'. In some embodiments, the addition code ADD_C may be set to have a logic level combination corresponding to an integer obtained by raising fractions (not lower than 0.5) of the subtraction/compensation value to a unit. For example, when the subtraction/compensation value has a value of '1.5', the addition code ADD_C may be set to have a logic level combination of '10', corresponding to an integer of '2'.

The compensated distribution signal generation circuit 245 may add the addition code ADD_C to the first output distribution signal ODST1 to generate the compensated distribution signal CODST. For example, when the first output distribution signal ODST1 has a logic level combination of '10' and the addition code ADD_C has a value of '1', the compensated distribution signal CODST may be set to have a logic level combination of '11'.

Figure 16:
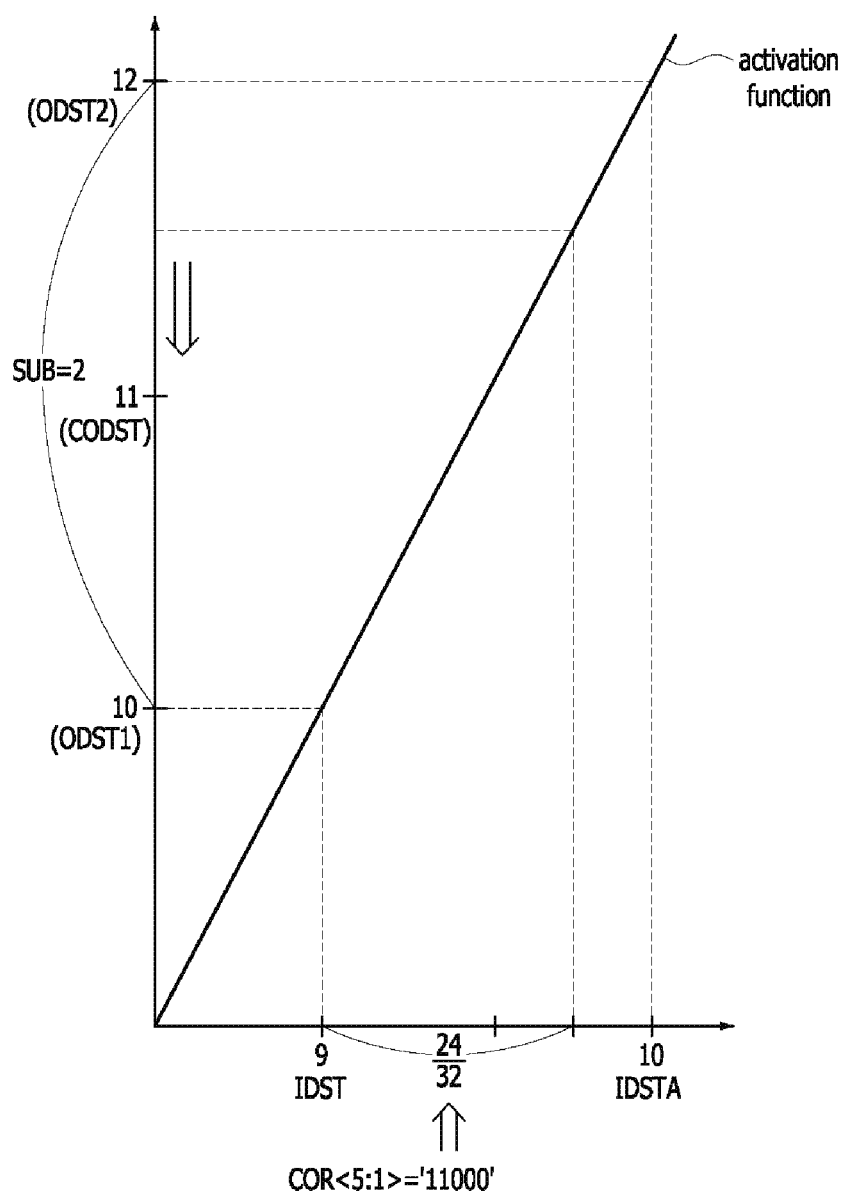
FIG. 16 is a graph, illustrating an operation of the output distribution signal compensation circuit, shown in FIG. 15.

FIG. 16 is a graph illustrating an operation of the output distribution signal compensation circuit 223. In the graph of FIG. 16, the abscissa denotes values of the input distribution signal IDST and the added input distribution signal IDSTA, and the ordinate denotes values of the first output distribution signal ODST1, the second output distribution signal ODST2, and the compensated distribution signal CODST. An operation for generating the compensated distribution signal CODST will be described hereinafter with reference to FIG. 16 in conjunction with a case in which the input distribution signal IDST has a value of '9' and the added input distribution signal IDSTA has a value of '10'.

In the embodiment, the first output distribution signal ODST1 may be generated to have a value of '10' based on the activation function when the input distribution signal IDST has a value of '9', and the second output distribution signal ODST2 may be generated to have a value of '12' based on the activation function when the added input distribution signal IDSTA has a value of '10'. Thus, the subtraction code SUB may be set as '2'. When the compensation signal COR has a value of '11000', the compensation value may be set as '24/32'. Accordingly, because the subtraction code SUB has a value of '2', the subtraction/compensation value may be calculated by a formula "2×24/32=48/32=1+16/32". Because the addition code ADD_C is set as an integer part of the subtraction/compensation value, the addition code ADD_C may have a value of '1'. The compensated distribution signal CODST may be set as a value of '11' corresponding to a value obtained by adding the addition code ADD_C to the first output distribution signal ODST1.

As described above, the arithmetic device 200 may generate the compensated distribution signal CODST by adding the addition code ADD_C, generated based on the compensation signal COR, to the first output distribution signal ODST1, selected and outputted based on the input distribution signal IDST along the activation function. Thus, the accuracy of the activation function may be improved.

Figure 17:
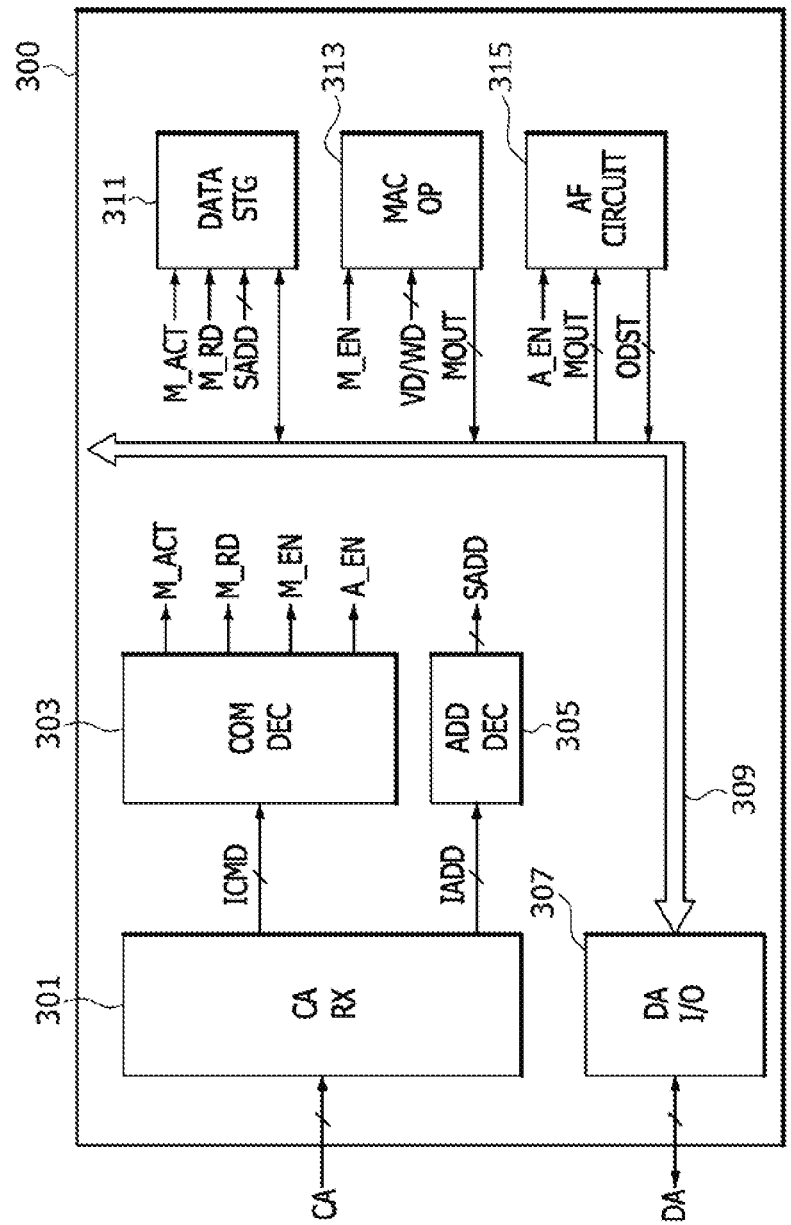
FIG. 17 is a block diagram, illustrating a configuration of an arithmetic device for a neural network, according to yet another embodiment of the present disclosure.

As illustrated in FIG. 17, an arithmetic device 300, according to yet another embodiment, may include a command/address receiving circuit (CA_RX) 301, a command decoder (COM_DEC) 303, an address decoder (ADD_DEC) 305, a data I/O circuit (DA_I/O) 307, a data I/O line 309, a data storage circuit (DATA_STG) 311, a MAC operator (MAC_OP) 313, and an AF circuit 315. The command/address receiving circuit 301 may receive a command/address signal CA to perform various internal operations from an external device that is outside of the arithmetic device 300. The external device may include a host, a controller, or a test apparatus. The various internal operations may include an arithmetic active operation, an arithmetic read operation, a MAC arithmetic operation, and an activation operation. The command/address signal CA may include a command and an address. The command/address receiving circuit 301 may extract the command from the command/address signal CA to output the extracted command as an internal command ICMD. The command/address receiving circuit 301 may extract the address from the command/address signal CA to output the extracted address as an internal address IADD.

The command decoder 303 may receive the internal command ICMD from the command/address receiving circuit 301. The command decoder 303 may decode the internal command ICMD to generate an arithmetic active signal M_ACT, an arithmetic read signal M_RD, an arithmetic control signal M_EN, and an activation control signal A_EN. The arithmetic active signal M_ACT may be activated to perform the arithmetic active operation to activate at least one of the memory banks that is included in the data storage circuit 311. The arithmetic read signal M_RD may be activated to perform the arithmetic read operation to output vector data VD and weight data WD from memory banks, which are activated by the arithmetic active operation, among the memory banks that are included in the data storage circuit 311. The arithmetic control signal M_EN may be activated to perform the MAC arithmetic operation for the vector data VD and the weight data WD, which are outputted from the data storage circuit 311 during the arithmetic read operation. The activation control signal A_EN may be activated to perform the activation operation, applying an activation function to an arithmetic result signal MOUT, generated by the MAC arithmetic operation to generate an output distribution signal ODST. The command decoder 303 may receive the internal command ICMD from the command/address receiving circuit 301 to sequentially activate the arithmetic active signal M_ACT, the arithmetic read signal M_RD, the arithmetic control signal M_EN, and the activation control signal A_EN.

The address decoder 305 may decode the internal address IADD to generate a selection address SADD. The selection address SADD may include a bank selection signal, a row address, and a column address to activate at least one of the memory banks that is included in the data storage circuit 311. In some embodiments, one of the memory banks that is included in the data storage circuit 311 may be selected and activated by the selection address SADD. Alternatively, in some other embodiments, two or more memory banks among the memory banks that are included in the data storage circuit 311 may be selected and activated by the selection address SADD.

The data I/O circuit 307 may receive external data DA from the external side of the arithmetic device 300 and may transmit the external data DA to at least one of the data storage circuit 311, the MAC operator 313, and the AF circuit 315 through the data I/O line 309. The data I/O circuit 307 may output data, which are outputted from at least one of the data storage circuit 311, the MAC operator 313, and the AF circuit 315 through the data I/O line 309, as the external data DA. The data I/O circuit 307 may include a data I/O buffer, a data input driver, a data output driver, and a deserializer to receive or output the external data DA.

The data storage circuit 311 may include a plurality of memory banks (not shown). Although the present embodiment is described in conjunction with a case in which the data storage circuit 311 employs memory banks as memory storage regions, the present disclosure is not limited thereto. For example, in some other embodiments, the data storage circuit 311 may be designed to include various memory storage regions other than the memory banks. Each of the memory banks that is included in the data storage circuit 311 may be independently activated based on the selection address SADD to output the data that is stored therein or to receive and store the data. Each of the memory banks that is included in the data storage circuit 311 may operate by using an interleaving design scheme. The number of the memory banks that are included in the data storage circuit 311 may be set to be different based on the embodiments. Each of the memory banks that is included in the data storage circuit 311 may include a plurality of memory cell arrays, and each memory cell array may include a plurality of memory cells, each of which is coupled to one of a plurality word lines and one of a plurality of bit lines. At least one of the memory banks may be selected by a bank selection signal that is included in the selection address SADD. One of the plurality word lines may be selected by a row address that is included in the selection address SADD, and at least one of the bit lines may be selected by a column address that is included in the selection address SADD.

The data storage circuit 311 may perform the arithmetic active operation based on the arithmetic active signal M_ACT and the selection address SADD to activate at least one of the memory banks that is included in the data storage circuit 311. The data storage circuit 311 may perform the arithmetic read operation based on the arithmetic read signal M_RD and the selection address SADD to output the vector data VD and/or the weight data WD from the activated memory banks.

The MAC operator 313 may receive the vector data VD and/or the weight data WD from the data storage circuit 311 during the arithmetic read operation. The MAC operator 313 may receive the vector data VD and/or the weight data WD from the data I/O circuit 307. The MAC operator 313 may perform the MAC arithmetic operation for the vector data VD and the weight data WD based on the arithmetic control signal M_EN to generate the arithmetic result signal MOUT. The MAC operator 313 may perform a multiplying operation and an accumulating operation for the vector data VD and the weight data WD to generate the arithmetic result signal MOUT during the MAC arithmetic operation. The MAC operator 313 may receive the output distribution signal ODST that is outputted from the AF circuit 315 as the vector data VD when multiple layers are applied in perceptron.

The AF circuit 315 may receive the arithmetic result signal MOUT from the MAC operator 313 during the MAC arithmetic operation. The AF circuit 315 may perform the activation operation based on the activation control signal A_EN to generate the output distribution signal ODST from the arithmetic result signal MOUT, The AF circuit 315 may store the activation function that is used during the activation operation in a look-up table form. The AF circuit 315 may select and output the output distribution signal ODST that corresponds to the arithmetic result signal MOUT based on a look-up table to which the activation function is applied when the activation operation is performed. In the present embodiment, the look-up table for the activation function that is stored in the AF circuit 315 may be realized to include only information on the output distribution signal ODST, corresponding to a first bit group among bits that are included in the arithmetic result signal MOUT. Thus, it may be possible to improve the speed of the activation operation and to reduce the storage space required for storing the activation function. The AF circuit 315 may compensate for an operation that extracts the output distribution signal ODST, corresponding to the first bit group among the bits that are included in the arithmetic result signal MOUT, with a second bit group among the bits that are included in the arithmetic result signal MOUT. This compensation may improve the accuracy of the activation operation. In some other embodiments, the AF circuit 315 may compensate for an operation that extracts the output distribution signal ODST, corresponding to the first bit group among the bits that are included in the arithmetic result signal MOUT, with the first bit group and the second bit group among the bits that are included in the arithmetic result signal MOUT, which improves the accuracy of the activation operation. The AF circuit 315 may output the output distribution signal ODST to the data I/O line 309. The output distribution signal ODST that is loaded on the data I/O line 309 may be outputted as the external data DA by the data I/O circuit 307. In some other embodiments, the output distribution signal ODST may be transmitted to and stored in the data storage circuit 311 or may be transmitted to the MAC operator 313.

Figure 18:
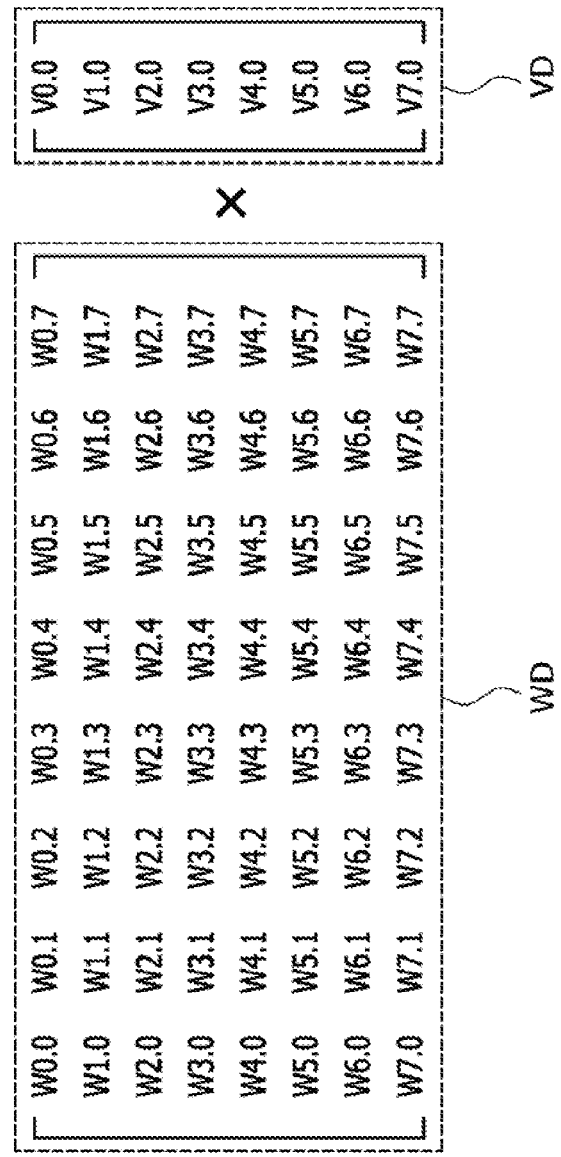
FIG. 18 illustrates an example of a MAC arithmetic operation, performed by a MAC operator, included in the arithmetic device of FIG. 17.

FIG. 18 illustrates an example of the MAC arithmetic operation that is performed by the MAC operator 313. The MAC arithmetic operation that is performed by the MAC operator 313 may include a multiplying operation and an accumulating operation (e.g., an accumulative adding operation) and may be executed by using a matrix multiplying calculation. As illustrated in FIG. 18, the MAC arithmetic operation may be executed by a matrix multiplying calculation of the weight data WD and the vector data VD. The weight data WD may be implemented to have an 'M×N' matrix form that includes weight elements W0.0~W7.7. In the 'M×N' matrix form that includes the weight elements W0.0~W7.7, "M" denotes the number of rows in the 'M×N' matrix form and "N" denotes the number of columns in the 'M×N' matrix form. The vector data VD may be implemented to have an 'N×1' matrix form that includes feature elements V0.0~V7.0. In the 'N×1' matrix form that includes the feature elements V0.0~V7.0, "N" denotes the number of rows in the 'N×1' matrix form. The weight elements W0.0~W7.7 and/or the feature elements V0.0~V7.0 may be outputted from at least one of the memory banks (not shown) that is included in the data storage circuit 311. The weight elements W0.0~W7.7 and/or the feature elements V0.0~V7.0 may be inputted through the data I/O circuit 307.

FIG. 19 illustrates various activation functions that are applicable to the AF circuit 315. As illustrated in FIG. 19, the various activation functions, such as Sigmoid (i.e., sigmoid function), Tan h (i.e., hyperbolic tangent activation function), ReLU (i.e., rectified linear unit function), leaky ReLU (i.e., leaky rectified linear unit function), and Maxout (i.e., max-out activation function) may be applied to the AF circuit 315. Each of the sigmoid activation function and the hyperbolic tangent activation function may be realized by using a non-linear function, each of the rectified linear unit activation function, the leaky rectified linear unit activation function, and the max-out activation function may be realized to include linear functions with different slopes by regions.

FIG. 20 is a table, illustrating an example of a look-up table for the hyperbolic tangent (Tan h) activation function that is illustrated in FIG. 19. Referring to FIG. 20, various values of the output distribution signal ODST that is selected based on the arithmetic result signal MOUT that is inputted to the hyperbolic tangent (Tan h) activation function are listed. For example, the output distribution signal ODST with a value of '0.4049' may be outputted when a value of the arithmetic result signal MOUT is within the range of '0.390625' to '0.453125' (see a first row of the look-up table illustrated in FIG. 20), and the output distribution signal ODST with a value of '0.4558' may be outputted when a value of the arithmetic result signal MOUT is within the range of '0.453125' to '0.515625' (see a second row of the look-up table illustrated in FIG. 20). Similarly, the output distribution signal ODST with a value of '1' may be outputted when a value of the arithmetic result signal MOUT is equal to or greater than '2.90625' (see a fifteenth row of the look-up table illustrated in FIG. 20).

FIG. 21 is a table, illustrating an example of a look-up table for the activation function, applied to the AF circuit 315. Referring to FIG. 21, various set values of the output distribution signal ODST that corresponds to the application results of the activation function are listed based on various set values (8-bit binary stream data) of the arithmetic result signal MOUT. For example, a first set value ODST0 may be selected as the output distribution signal ODST when the arithmetic result signal MOUT with 8-bit binary stream data of '00000000' that corresponds to a decimal number of '0' is applied to the activation function, and a second set value ODST1 may be selected as the output distribution signal ODST when the arithmetic result signal MOUT with 8-bit binary stream data of '00000001' that corresponds to a decimal number of '1' is applied to the activation function. Similarly, a $256^{th}$ set value ODST255 may be selected as the output distribution signal ODST when the arithmetic result signal MOUT with 8-bit binary stream data of '11111111' that corresponds to a decimal number of '256' is applied to the activation function. Although the example of FIG. 21 is illustrated in conjunction with a look-up table that is set when the arithmetic result signal MOUT with 8-bit binary stream data is applied to the activation function, the present disclosure is not limited to the example of FIG. 21. That is, the arithmetic result signal MOUT may be set to have any one of various types of data based on the embodiments.

Figure 22:
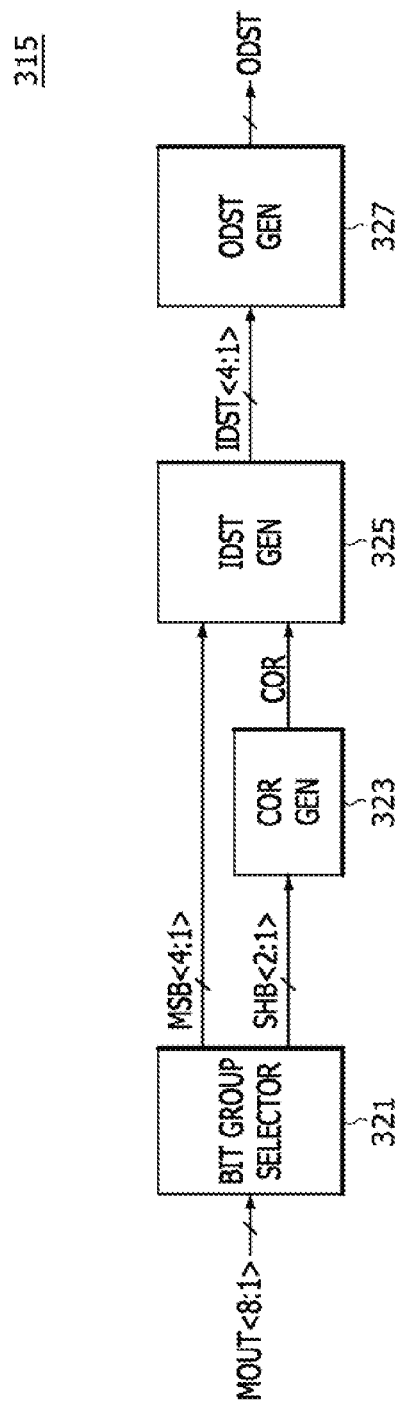
FIG. 22 is a block diagram, illustrating a configuration of an AF circuit, included in the arithmetic device of FIG. 17.

FIG. 22 is a block diagram, illustrating a configuration of the AF circuit 315, included in the arithmetic device 300. As illustrated in FIG. 22, the AF circuit 315 may extract the first bit group from the arithmetic result signal MOUT and may select and output a set value of the output distribution signal ODST that corresponds to the first bit group. Since the AF circuit 315 requires only a look-up table for an activation function that is capable of selecting the output distribution signal ODST, corresponding to the first bit group, included in the arithmetic result signal MOUT, it may be possible to improve the speed of the activation operation and to reduce the storage space that is required for storing the activation function. In addition, the AF circuit 315 may extract a first bit group and a second bit group from the arithmetic result signal MOUT and may compensate for an operation that selects the output distribution signal ODST that corresponds to the first bit group of the arithmetic result signal MOUT with the second bit group of the arithmetic result signal MOUT, which improves the accuracy of the activation operation. Alternatively, the AF circuit 315 may extract the first bit group and the second bit group from the arithmetic result signal MOUT and may compensate for an operation that selects the output distribution signal ODST that corresponds to the first bit group of the arithmetic result signal MOUT with the first and second bit groups of the arithmetic result signal MOUT, which improves the accuracy of the activation operation. In order to obtain the above advantages, the AF circuit 315 may be designed to include a bit group selector 321, a correction code generator 323, an input distribution signal generator 325, and an output distribution signal generator 327. Although the following embodiment is described in conjunction with a case in which the arithmetic result signal MOUT is set as 8-bit binary stream data, the first bit group is set as 4-bit binary stream data, and the second bit group is set as 2-bit binary stream data, the present disclosure is not limited to the following embodiment. That is, the number of bits that are included in the arithmetic result signal MOUT, the number of bits that are included in the first bit group, and the number of bits that are included in the second bit group may be set to be different based on the embodiments.

The bit group selector 321 may extract the first bit group MSB<4:1> and the second bit group SHB<2:1> from the arithmetic result signal MOUT<8:1>. The bit group selector 321 may select and output four bits that correspond to the most significant bits among bits that are included in the arithmetic result signal MOUT<8:1> as the first bit group MSB<4:1>. The bit group selector 321 may select and output two bits that correspond to the second most significant bits among the bits that are included in the arithmetic result signal MOUT<8:1> as the second bit group SHB<2:1>. In the present embodiment, although the first bit group is selected to have the most significant bits of the arithmetic result signal MOUT and the second bit group is selected to have the second most significant bits of the arithmetic result signal MOUT, the present disclosure is not limited thereto. That is, in some embodiments, each of the first and second bit groups may be selected from the bits that are included in the arithmetic result signal MOUT by using various methods. For example, when the arithmetic result signal MOUT includes bits that correspond to an integer and bits that correspond to a decimal fraction, the first bit group may be selected to have the bits that correspond to the integer and the second bit group may be selected to have the bits that correspond to the decimal fraction.

An operation for extracting the first bit group MSB<4:1> and the second bit group SHB<2:1> from the arithmetic result signal MOUT<8:1> will be described hereinafter with reference to FIG. 23. As illustrated in FIG. 23, eighth to fifth bits MOUT<8:5> of the arithmetic result signal MOUT<8:1> may have respective ones of decimal numbers of '$2^7$', '$2^6$', '$2^5$', and '$2^4$' to correspond to four bits with the relatively largest values among the bits that are included in the arithmetic result signal MOUT<8:1>. Thus, the eighth to fifth bits MOUT<8:5> of the arithmetic result signal MOUT<8:1> may be selected as the first bit group MSB<4:1>. In addition, fourth and third bits MOUT<4:3> of the arithmetic result signal MOUT<8:1> may have respective ones of decimal numbers of '$2^3$' and '$2^2$' to correspond to two bits with the second largest values among the bits that are included in the arithmetic result signal MOUT<8:1>. Thus, the fourth and third bits MOUT<4:3> of the arithmetic result signal MOUT<8:1> may be selected as the second bit group SHB<2:1>. Although the present embodiment is described in conjunction with a case in which the first bit group MSB<4:1> with four bits is extracted from the arithmetic result signal MOUT<8:1>, which is set to have 8-bit binary stream data, and the second bit group SHB<2:1> with two bits is extracted from the arithmetic result signal MOUT<8:1>, which is set to have 8-bit binary stream data, the present disclosure is not limited to the present embodiment. That is, the number of bits that are included in the arithmetic result signal MOUT may be set to be different according to the embodiments, the number of bits that are included in the first bit group may be set to be different according to the embodiments, and the number of bits that are included in the second bit group may be set to be different according to the embodiments.

Referring to FIG. 24, the first bit group MSB<4:1> and the second bit group SHB<2:1>, selected based on the arithmetic result signal MOUT<8:1>, set to have binary stream data, are listed. For example, when the arithmetic result signal MOUT<8:1> has data of '00000000', the first bit group MSB<4:1> may be selected to have data of '0000', and the second bit group SHB<2:1> may be selected to have data of '00'. Furthermore, when the arithmetic result signal MOUT<8:1> has data of '00000100', the first bit group MSB<4:1> may be selected to have data of '0000', and the second bit group SHB<2:1> may be selected to have data of '01'. Similarly, when the arithmetic result signal MOUT<8:1> has data of '11110000', the first bit group MSB<4:1> may be selected to have data of '1111', and the second bit group SHB<2:1> may be selected to have data of '00'.

Referring to FIG. 22, the correction code generator 323 may receive the second bit group SHB<2:1> from the bit group selector 321. The correction code generator 323 may generate a correction code COR to compensate for an input distribution signal IDST<4:1> from the second bit group SHB<2:1>, The correction code generator 323 may drive the correction code COR to a power source voltage VDD based on the second bit group SHB<2:1> to generate the correction code COR with a binary number of '1' or may drive the correction code COR to a ground voltage VSS based on the second bit group SHB<2:1> to generate the correction code COR with a binary number of '0'.

Referring again to FIG. 22, the input distribution signal generator 325 may receive the first bit group MSB<4:1> from the bit group selector 321 and may receive the correction code COR from the correction code generator 323. The input distribution signal generator 325 may add the correction code COR to the first bit group MSB<4:1> to generate the input distribution signal IDST<4:1>. The input distribution signal generator 325 may output the first bit group MSB<4:1> as the input distribution signal IDST<4:1> when the correction code COR is set to have a binary number of '0'. The input distribution signal generator 325 may add a binary number of '1' to the first bit group MSB<4:1> to generate the input distribution signal IDST<4:1> when the correction code COR is set to have a binary number of '1'.

Referring still to FIG. 22, the output distribution signal generator 327 may receive the input distribution signal IDST<4:1> from the input distribution signal generator 325.

The output distribution signal generator 327 may include a look-up table with information regarding the activation function. The output distribution signal generator 327 may select and output a set value of the output distribution signal ODST that corresponds to a set value of the input distribution signal IDST<4:1> based on the look-up table. The look-up table that is included in the output distribution signal generator 327 may include information regarding set values of the output distribution signal ODST that corresponds to an application result of the activation function relative to set values of the input distribution signal IDST<4:1>. Thus, the amount of information in the look-up table that is included in the output distribution signal generator 327 may be drastically reduced as compared to the look-up table for the arithmetic result signal MOUT<8:1>, which is set to have 8-bit binary stream data. In addition, the output distribution signal generator 327 may select the output distribution signal ODST that corresponds to the input distribution signal IDST<4:1>. Thus, the activation operation may be performed relatively faster as compared to a case in which selects the output distribution signal ODST that corresponds to the arithmetic result signal MOUT<8:1>. The input distribution signal IDST<4:1> may be compensated by the correction code COR that is generated from the second bit group SHB<2:1>, which improves the accuracy of the activation operation.

Figure 25:
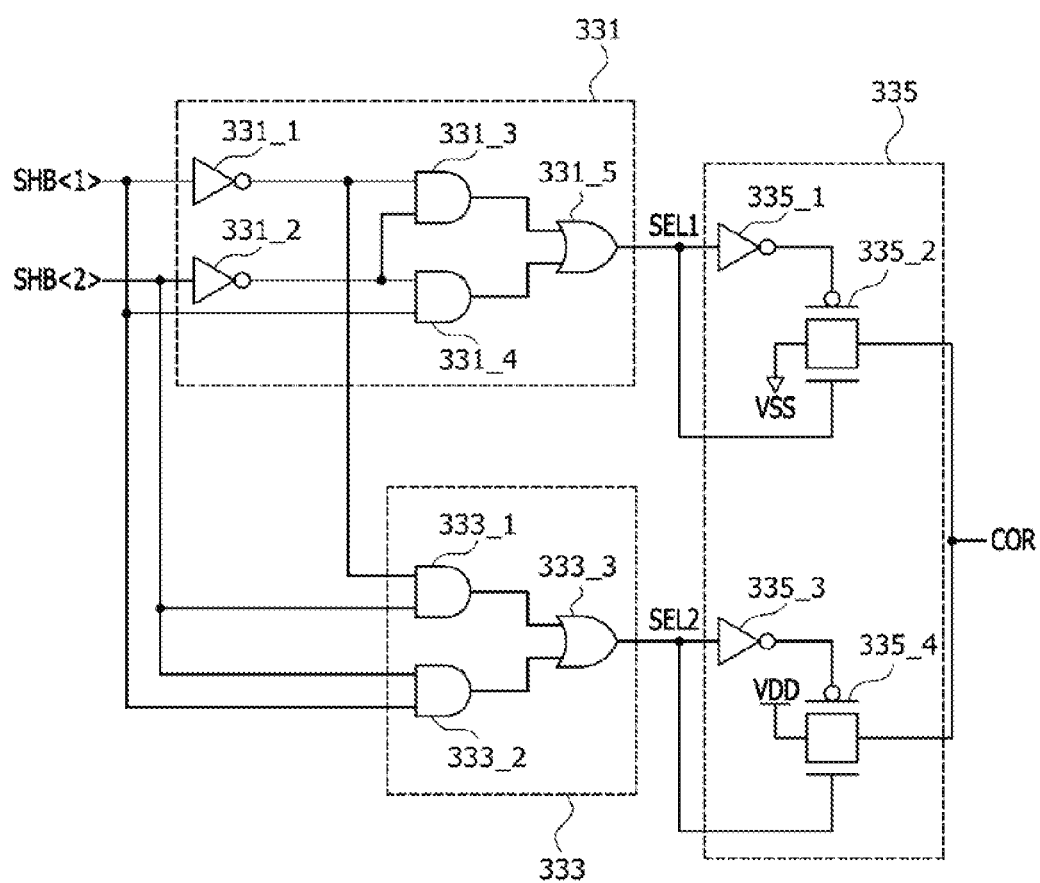
FIG. 25 is a circuit diagram, illustrating a configuration of a correction code generator, included in the AF circuit of FIG. 22.
Figure 26:
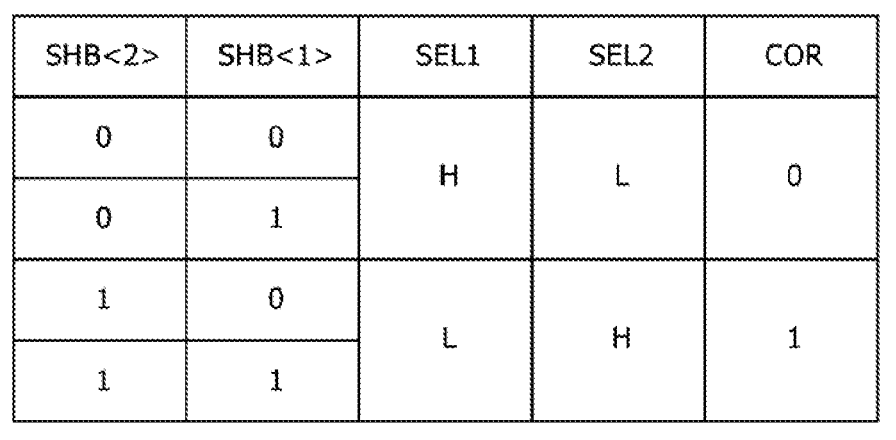

FIG. 25 is a circuit diagram, illustrating a configuration of the correction code generator 323, and FIG. 26 is a table, illustrating an operation of the correction code generator 323.

As illustrated in FIG. 25, the correction code generator 323 may include a first drive selection signal generation circuit 331, a second drive selection signal generation circuit 333, and a correction code output circuit 335. The first drive selection signal generation circuit 331 may perform inversion operations, AND operations, and OR operations. Specifically, the first drive selection signal generation circuit 331 may include inverters 331_1 and 331_2, AND gates 331_3 and 331_4, and an OR gate 331_5. The inverter 331_1 may inversely buffer a first bit SHB<1> of the second bit group SHB<2:1> to output the inversely buffered signal of the first bit SHB<1> of the second bit group SHB<2:1>, The inverter 331_2 may inversely buffer a second bit SHB<2> of the second bit group SHB<2:1> to output the inversely buffered signal of the second bit SHB<2> of the second bit group SHB<2:1>. The AND gate 331_3 may perform a logical AND operation for an output signal of the inverter 331_1 and an output signal of the inverter 331_2. The AND gate 331_4 may perform a logical AND operation for the first bit SHB<1> of the second bit group SHB<2:1> and the output signal of the inverter 331_2. The OR gate 331_5 may perform a logical OR operation for an output signal of the AND gate 331_3 and an output signal of the AND gate 331_4 to generate a first drive selection signal SELL The second drive selection signal generation circuit 333 may include AND gates 333_1 and 333_2 and an OR gate 333_3. The AND gate 333_1 may perform a logical AND operation for the output signal of the inverter 331_1 and the second bit SHB<2> of the second bit group SHB<2:1>. The AND gate 333_2 may perform a logical AND operation for the first bit SHB<1> of the second bit group SHB<2:1> and the second bit SHB<2> of the second bit group SHB<2:1>. The OR gate 331_5 may perform a logical OR operation for an output signal of the AND gate 333_1 and an output signal of the AND gate 333_2 to generate a second drive selection signal SEL2. The correction code output circuit 335 may include inverters 335_1 and 335_3 and transfer gates 335_2 and 335_4. The inverter 335_1 may inversely buffer the first drive selection signal SEL1 to output the inversely buffered signal of the first drive selection signal SELL The inverter 335_3 may inversely buffer the second drive selection signal SEL2 to output the inversely buffered signal of the second drive selection signal SEL2. The transfer gate 335_2 may be turned on to drive the correction code COR to a logic "low" level that corresponds to the ground voltage VSS when the first drive selection signal SEL1 has a logic "high" level. The transfer gate 335_4 may be turned on to drive the correction code COR to a logic "high" level that corresponds to the power source voltage VDD when the second drive selection signal SEL2 has a logic "high" level.

As illustrated in FIG. 26, when the second bit group SHB<2:1> is set to have binary stream data of '00' or '01', the first drive selection signal SEL1 may be generated to have a logic "high(H)" level, and the second drive selection signal SEL2 may be generated to have a logic "low(L)" level. In such a case, the correction code COR may be driven to a logic "low(L)" level by the first drive selection signal SEL1 with a logic "high(H)" level, thereby being set as a binary number of '0'. When the second bit group SHB<2:1> is set to have binary stream data of '10' or '11', the first drive selection signal SEL1 may be generated to have a logic "low(L)" level, and the second drive selection signal SEL2 may be generated to have a logic "high(H)" level. In such a case, the correction code COR may be driven to a logic "high(H)" level by the second drive selection signal SEL2 with a logic "high(H)" level, thereby being set as a binary number of '1'.

An operation of the AF circuit 315 including the correction code generator 323 described with reference to FIGS. 25 and 26 will be described hereinafter with reference to FIGS. 27 to 30.

Figure 28:
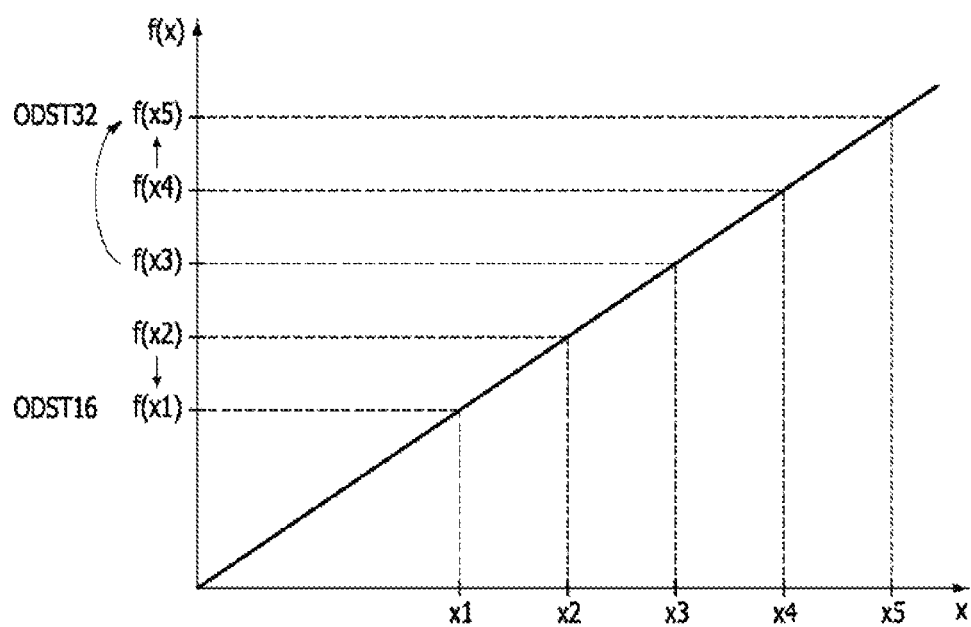

Referring to FIGS. 27 and 28, set values of the output distribution signal ODST that is selected by the application of the activation function based on the first bit group MSB<4:1> and the second bit group SHB<2:1> are listed. For the purpose of ease and convenience in explanation, it may be assumed that the activation function is a linear function illustrated in FIG. 28. Because the correction code COR is generated to have a value of '0' at a state 'x1' in which the first bit group MSB<4:1> is set to have a binary stream of '0001' and the second bit group SHB<2:1> is set to have a binary stream of '00', the input distribution signal IDST<4:1> may be generated to have a binary stream of '0001' which is the same as a binary stream of the first bit group MSB<4:1>. In such a case, a functional value 'f(x1)' of the activation function that corresponds to the state 'x1' may be selected to have a sixteenth set value 'ODST16' of the output distribution signal ODST, which corresponds to a set value '0001' of the input distribution signal IDST<4:1>. Because the correction code COR is generated to have a value of '0' at a state 'x2' in which the first bit group MSB<4:1> is set to have a binary stream of '0001' and the second bit group SHB<2:1> is set to have a binary stream of '01', the input distribution signal IDST<4:1> may be generated to have a binary stream of '0001', which is the same as a binary stream of the first bit group MSB<4:1>. In such a case, a functional value 'f(x2)' of the activation function that corresponds to the state 'x2' may be selected to have the sixteenth set value 'ODST16' of the output distribution signal ODST, which corresponds to a set value '0001' of the input distribution signal IDST<4:1>. Because the correction code COR is generated to have a value of '1' at a state 'x3' in which the first bit group MSB<4:1> is set to have a binary stream of '0001' and the second bit group SHB<2:1> is set to have a binary stream of '10', the input distribution signal IDST<4:1> may be generated to have a binary stream of '0010' that is obtained by adding a value of '1' to the first bit group MSB<4:1>. In such a case, a functional value 'f(x3)' of the activation function that corresponds to the state 'x3' may be selected to have a thirty second set value ° ODST32' of the output distribution signal ODST, which corresponds to a set value '0010' of the input distribution signal IDST<4:1>. Because the correction code COR is generated to have a value of '1' at a state 'x4' in which the first bit group MSB<4:1> is set to have a binary stream of '0001' and the second bit group SHB<2:1> is set to have a binary stream of '11', the input distribution signal IDST<4:1> may be generated to have a binary stream of '0010' that is obtained by adding a value of '1' to the first bit group MSB<4:1>. In such a case, a functional value 'f(x4)' of the activation function that corresponds to the state 'x4' may be selected to have the thirty second set value 'ODST32' of the output distribution signal ODST, which corresponds to a set value '0010' of the input distribution signal IDST<4:1>. Because the correction code COR is generated to have a value of '0' at a state 'x5' in which the first bit group MSB<4:1> is set to have a binary stream of '0010' and the second bit group SHB<2:1> is set to have a binary stream of '00', the input distribution signal IDST<4:1> may be generated to have a binary stream of '0010' which is the same as a binary stream of the first bit group MSB<4:1>. In such a case, a functional value 'f(x5)' of the activation function that corresponds to the state 'x5' may be selected to have the thirty second set value 'ODST32' of the output distribution signal ODST, which corresponds to a set value '0010' of the input distribution signal IDST<4:1>.

Figure 29:
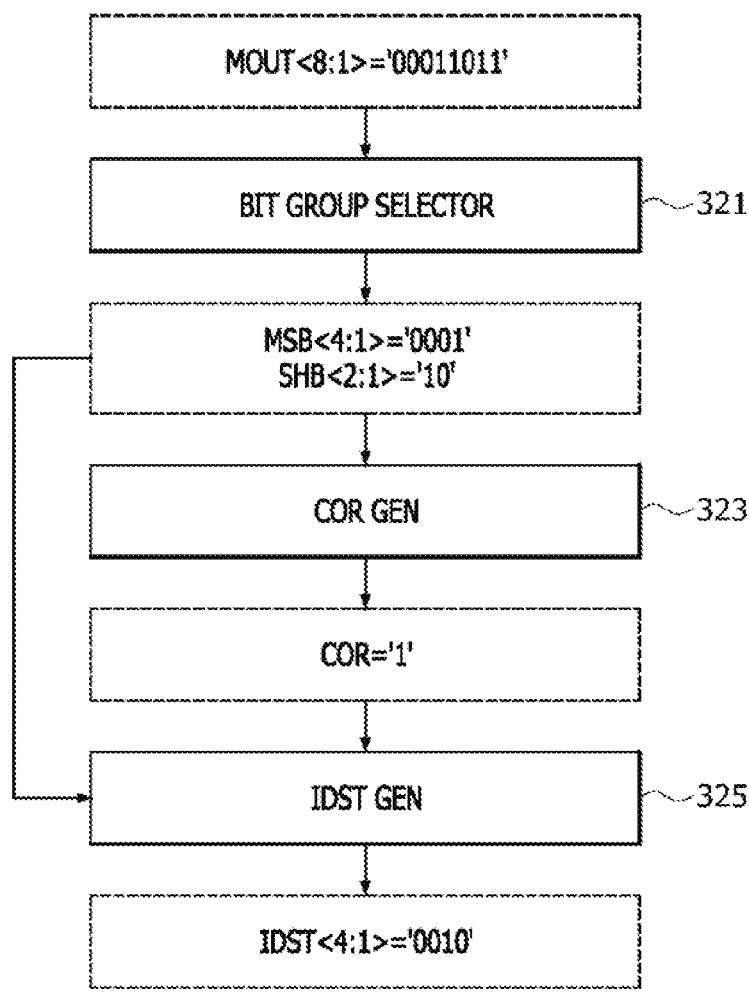
Figure 30:
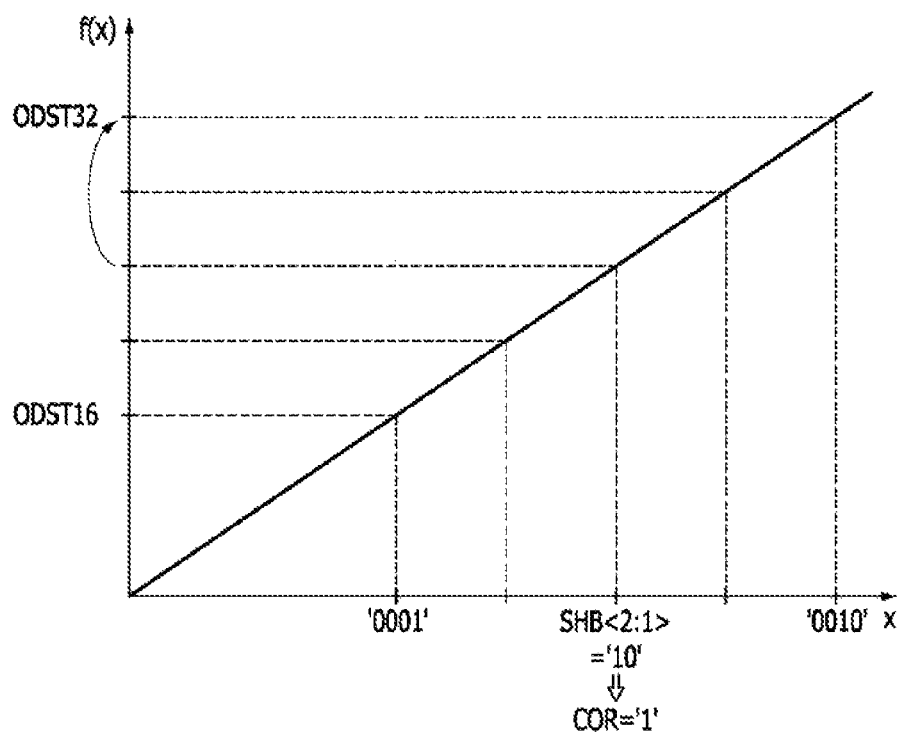

Referring to FIGS. 29 and 30, an operation performed by the AF circuit 315 at a state in which the arithmetic result signal MOUT<8:1> is set to have a binary stream of '00011011' is illustrated in detail. As illustrated in FIG. 29, the bit group selector 321 may extract the first bit group MSB<4:1> that is set as a binary stream of '0001' and the second bit group SHB<2:1> that is set as a binary stream of '10' from the MOUT<8:1> that is set to have a binary stream of '00011011'. The correction code generator 323 may generate the correction code COR with a value of '1' from the second bit group SHB<2:1> that is set as a binary stream of '10'. The input distribution signal generator 325 may add a value of '1' to the first bit group MSB<4:1> to generate the input distribution signal IDST<4:1> that is set to have a binary stream of '0010'. Referring again to FIG. 27, the sixteenth set value 'ODST16' of the output distribution signal ODST may correspond to the input distribution signal IDST<4:1> that is set to have a binary stream of '0001' by the activation function, and the thirty second set value 'ODST32' of the output distribution signal ODST may correspond to the input distribution signal IDST<4:1> that is set to have a binary stream of '0010' by the activation function. When the second bit group SHB<2:1> is set as a binary stream of '10', the correction code COR may be generated to have a value of '1' and the input distribution signal IDST<4:1> may be compensated to have a binary stream of '0010' by adding a value of '1' to the first bit group MSB<4:1>. Thus, the AF circuit 315 may select and output the thirty second set value 'ODST32' of the output distribution signal ODST. In the present embodiment, the AF circuit 315 may compensate for the input distribution signal IDST<4:1> by using the second bit group SHB<2:1> when the activation function is applied to the input distribution signal IDST<4:1> generated from the first bit group MSB<4:1> extracted from the arithmetic result signal MOUT<8:1>, which improves the accuracy of the activation operation.

Figure 31:
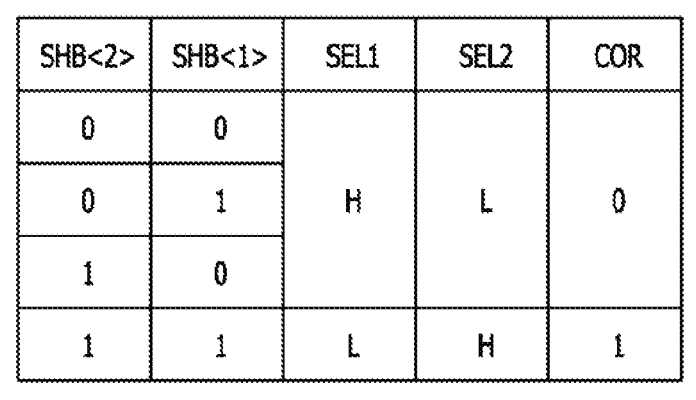

FIG. 31 is a table illustrating an operation of a correction code generator (not shown) that corresponds to another example of the correction code generator 323. As illustrated in FIG. 31, when the second bit group SHB<2:1> is set to have any one of binary streams of '00', '01', and '10', the first drive selection signal SEL1 may be generated to have a logic "high(H)" level and the second drive selection signal SEL2 may be generated to have a logic "low(L)" level. In such a case, the correction code COR may be driven to a logic "low(L)" level by the first drive selection signal SEL1 with a logic "high(H)" level, thereby being set as a binary number of '0'. When the second bit group SHB<2:1> is set to have a binary stream of '11', the first drive selection signal SEL1 may be generated to have a logic "low(L)" level and the second drive selection signal SEL2 may be generated to have a logic "high(H)" level. In such a case, the correction code COR may be driven to a logic "high(H)" level by the second drive selection signal SEL2 with a logic "high(H)" level, thereby being set as a binary number of '1'.

An operation of the AF circuit including the correction code generator described with reference to FIG. 31 will be described hereinafter with reference to FIGS. 32 to 34.

Referring to FIG. 32, set values of the output distribution signal ODST selected by application of the activation function based on the first bit group MSB<4:1> and the second bit group SHB<2:1> are listed. Because the correction code COR is generated to have a value of '0' at a state 'x1' in which the first bit group MSB<4:1> is set to have a binary stream of '0001' and the second bit group SHB<2:1> is set to have a binary stream of '00', the input distribution signal IDST<4:1> may be generated to have a binary stream of '0001' which is the same as a binary stream of the first bit group MSB<4:1>. In such a case, a functional value 'f(x1)' of the activation function that corresponds to the state 'x1' may be selected to have a sixteenth set value 'ODST16' of the output distribution signal ODST, which corresponds to a set value '0001' of the input distribution signal IDST<4:1>. Because the correction code COR is generated to have a value of '0' at a state 'x2' in which the first bit group MSB<4:1> is set to have a binary stream of '0001' and the second bit group SHB<2:1> is set to have a binary stream of '01', the input distribution signal IDST<4:1> may be generated to have a binary stream of '0001' which is the same as a binary stream of the first bit group MSB<4:1>. In such a case, a functional value 'f(x2)' of the activation function that corresponds to the state 'x2' may be selected to have the sixteenth set value 'ODST16' of the output distribution signal ODST, which corresponds to a set value '0001' of the input distribution signal IDST<4:1>. Because the correction code COR is generated to have a value of '0' at a state 'x3' in which the first bit group MSB<4:1> is set to have a binary stream of '0001' and the second bit group SHB<2:1> is set to have a binary stream of '10', the input distribution signal IDST<4:1> may be generated to have a binary stream of '0001' which is the same as a binary stream of the first bit group MSB<4:1>. In such a case, a functional value 'f(x3)' of the activation function that corresponds to the state 'x3' may be selected to have the sixteenth set value 'ODST16' of the output distribution signal ODST, which corresponds to a set value '0001' of the input distribution signal IDST<4:1>. Because the correction code COR is generated to have a value of '1' at a state 'x4' in which the first bit group MSB<4:1> is set to have a binary stream of '0001' and the second bit group SHB<2:1> is set to have a binary stream of '11', the input distribution signal IDST<4:1> may be generated to have a binary stream of '0010' that is obtained by adding a value of '1' to the first bit group MSB<4:1>. In such a case, a functional value 'f(x4)' of the activation function that corresponds to the state 'x4' may be selected to have a thirty second set value 'ODST32' of the output distribution signal ODST, which corresponds to a set value '0010' of the input distribution signal IDST<4:1>. Because the correction code COR is generated to have a value of '0' at a state 'x5' in which the first bit group MSB<4:1> is set to have a binary stream of '0010' and the second bit group SHB<2:1> is set to have a binary stream of '00', the input distribution signal IDST<4:1> may be generated to have a binary stream of '0010' which is the same as a binary stream of the first bit group MSB<4:1>. In such a case, a functional value 'f(x5)' of the activation function that corresponds to the state 'x5' may be selected to have the thirty second set value 'ODST32' of the output distribution signal ODST, which corresponds to a set value '0010' of the input distribution signal IDST<4:1>.

Figure 33:
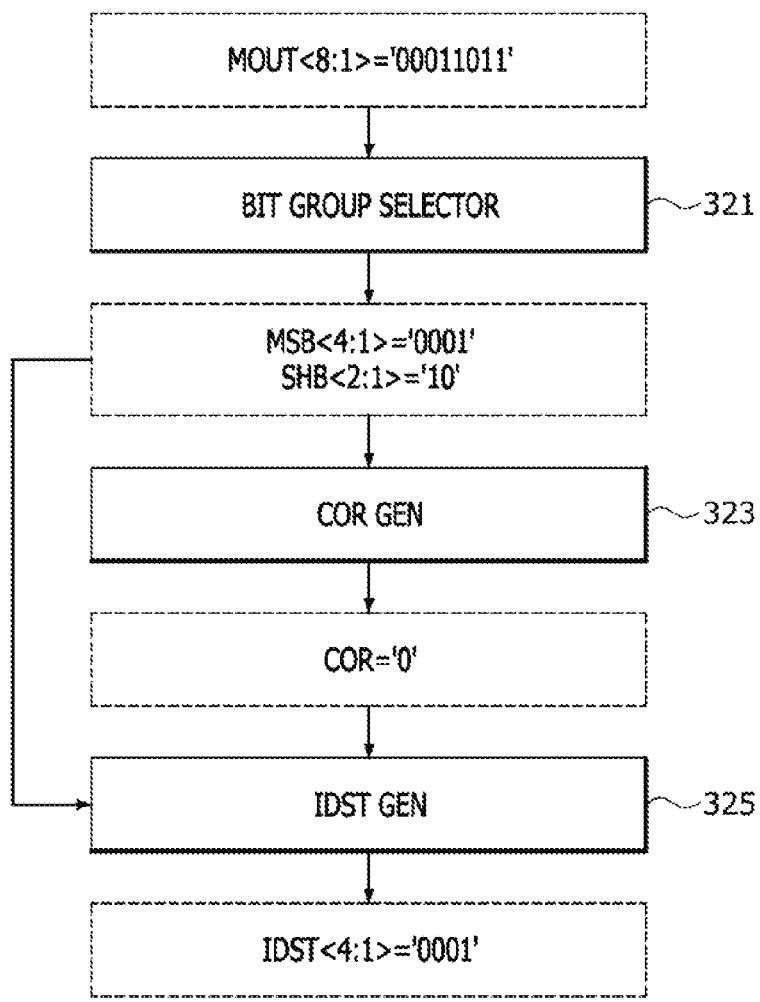
Figure 34:
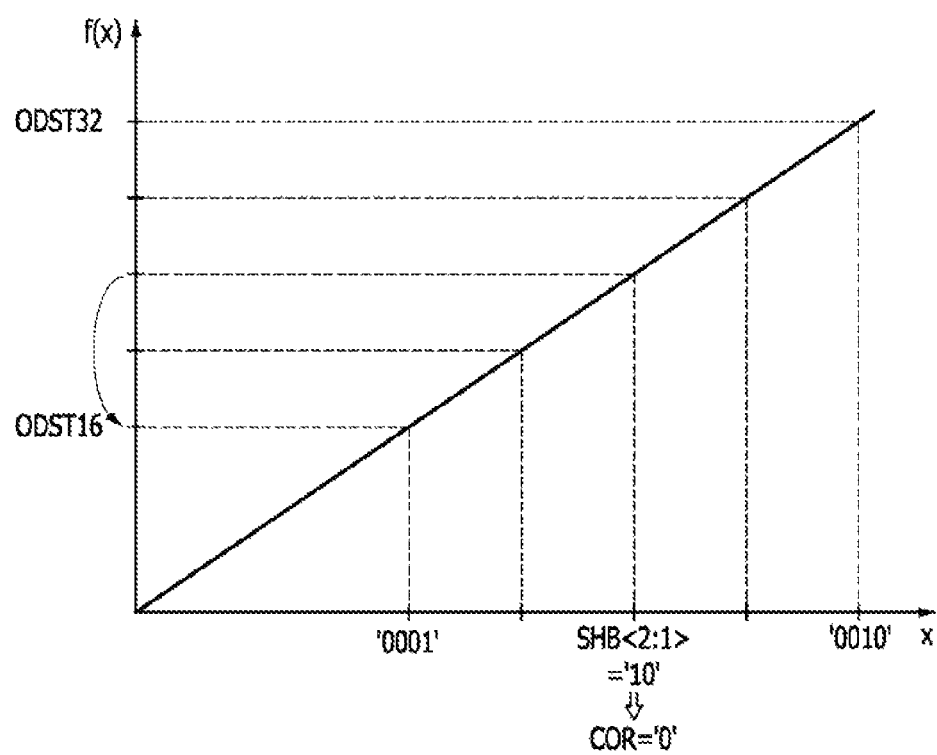

Referring to FIGS. 33 and 34, an operation that is performed by the AF circuit 315 at a state in which the arithmetic result signal MOUT<8:1> is set to have a binary stream of '00011011' is illustrated in detail. As illustrated in FIG. 33, the bit group selector 321 may extract the first bit group MSB<4:1> that is set as a binary stream of '0001' and the second bit group SHB<2:1> that is set as a binary stream of '10' from the MOUT<8:1> that is set to have a binary stream of '00011011'. The correction code generator (not shown) may generate the correction code COR with a value of '0' from the second bit group SHB<2:1> that is set as a binary stream of '10'. The input distribution signal generator 325 may generate the input distribution signal IDST<4:1> that is set to have a binary stream of '0010' that is the same as a binary stream of the first bit group MSB<4:1>, As illustrated in FIG. 34, when the second bit group SHB<2:1> is set as a binary stream of '10', the correction code COR may be generated to have a value of '0' and the input distribution signal IDST<4:1> may be generated to have a binary stream of '0001' that is the same as a binary stream of the first bit group MSB<4:1>. Thus, the AF circuit 315 may select and output the sixteenth set value 'ODST16' of the output distribution signal ODST.

Figure 35:
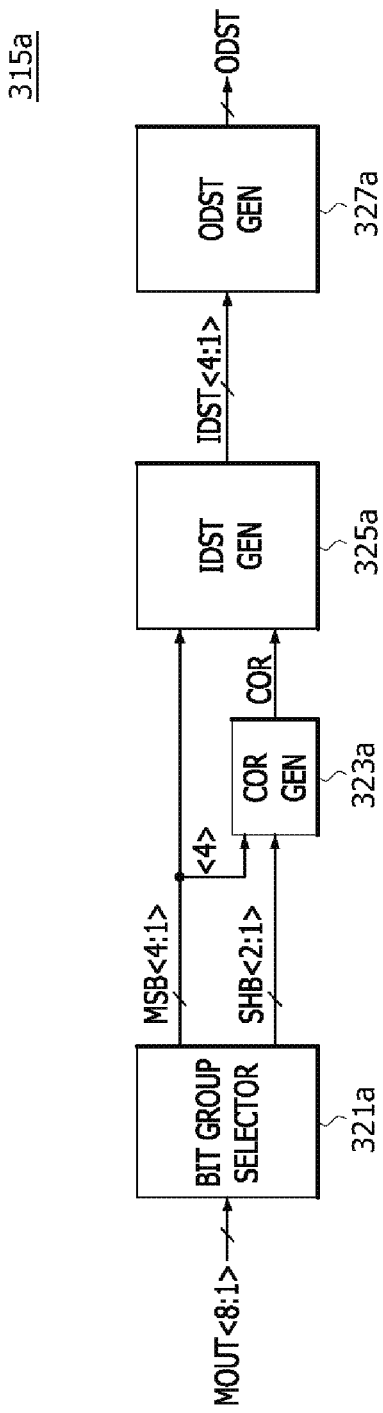
FIG. 35 is a block diagram, illustrating a configuration of an AF circuit, corresponding to another example of an AF circuit, included in the arithmetic device of FIG. 17.

FIG. 35 is a block diagram, illustrating a configuration of an AF circuit 315a that corresponds to another example of the AF circuit 315, included in the arithmetic device 300. As illustrated in FIG. 35, the AF circuit 315a may be designed to include a bit group selector 321a, a correction code generator 323a, an input distribution signal generator 325a, and an output distribution signal generator 327a.

The bit group selector 321a may extract the first bit group MSB<4:1> and the second bit group SHB<2:1> from the arithmetic result signal MOUT<8:1>. The bit group selector 321a may select and output four bits that correspond to most significant bits among bits that are included in the arithmetic result signal MOUT<8:1> as the first bit group MSB<4:1>. The bit group selector 321a may select and output two bits that correspond to second most significant bits among the bits that are included in the arithmetic result signal MOUT<8:1> as the second bit group SHB<2:1>.

The correction code generator 323a may receive the fourth bit MSB<4> of the first bit group MSB<4:1> and all of bits of the second bit group SHB<2:1> from the bit group selector 321a. The correction code generator 323a may generate a correction code COR to compensate for the input distribution signal IDST<4:1> from the fourth bit MSB<4> of the first bit group MSB<4:1> and all of bits of the second bit group SHB<2:1>. The correction code generator 323a may drive the correction code COR to the power source voltage VDD based on the fourth bit MSB<4> of the first bit group MSB<4:1> and all of bits of the second bit group SHB<2:1> to generate the correction code COR with a binary number of '1' or may drive the correction code COR to the ground voltage VSS based on the fourth bit MSB<4> of the first bit group MSB<4:1> and all of bits of the second bit group SHB<2:1> to generate the correction code COR with a binary number of '0'.

The input distribution signal generator 325a may receive the first bit group MSB<4:1> from the bit group selector 321a and may receive the correction code COR from the correction code generator 323a. The input distribution signal generator 325a may add the correction code COR to the first bit group MSB<4:1> to generate the input distribution signal IDST<4:1>.

The output distribution signal generator 327a may receive the input distribution signal IDST<4:1> from the input distribution signal generator 325a. The output distribution signal generator 327a may include a look-up table with information on the activation function. The output distribution signal generator 327a may select and output a set value of the output distribution signal ODST that corresponds to a set value of the input distribution signal IDST<4:1> based on the look-up table. The input distribution signal IDST<4:1> may be compensated by the correction code COR generated from the fourth bit MSB<4> of the first bit group MSB<4:1> and all of bits of the second bit group SHB<2:1>, which improves the accuracy of the activation operation.

FIG. 36 is a table illustrating an operation of the correction code generator 323a. As illustrated in FIG. 36, when the fourth bit MSB<4> of the first bit group MSB<4:1> is set to have a binary number of '1' and the second bit group SHB<2:1> is set to have a binary stream of '00' or '01', the first drive selection signal SEL1 may be generated to have a logic "high(H)" level and the second drive selection signal SEL2 may be generated to have a logic "low(L)" level. In such a case, the correction code COR may be set to have a value of '0' by the first drive selection signal SEL1 with a logic "high(H)" level. When the fourth bit MSB<4> of the first bit group MSB<4:1> is set to have a binary number of '1' and the second bit group SHB<2:1> is set to have a binary stream of '10' or '11', the first drive selection signal SEL1 may be generated to have a logic "low(L)" level and the second drive selection signal SEL2 may be generated to have a logic "high(H)" level. In such a case, the correction code COR may be set to have a value of '1' by the second drive selection signal SEL2 with a logic "high(H)" level. When the fourth bit MSB<4> of the first bit group MSB<4:1> is set to have a binary number of '0' and the second bit group SHB<2:1> is set to have a binary stream of '00', '01', or '10', the first drive selection signal SEL1 may be generated to have a logic "high(H)" level and the second drive selection signal SEL2 may be generated to have a logic "low(L)" level. In such a case, the correction code COR may be set to have a value of '0' by the first drive selection signal SEL1 with a logic "high(H)" level. When the fourth bit MSB<4> of the first bit group MSB<4:1> is set to have a binary number of '0' and the second bit group SHB<2:1> is set to have a binary stream of '11', the first drive selection signal SEL1 may be generated to have a logic "low(L)" level and the second drive selection signal SEL2 may be generated to have a logic "high(H)" level. In such a case, the correction code COR may be set to have a value of '1' by the second drive selection signal SEL2 with a logic "high(H)" level.

As described above, the AF circuit 315a may compensate for the input distribution signal IDST<4:1> by using the fourth bit MSB<4> of the first bit group MSB<4:1> and all of bits of the second bit group SHB<2:1> when the activation function is applied to the input distribution signal IDST<4:1> generated from the first bit group MSB<4:1> extracted from the arithmetic result signal MOUT<8:1>, which improves the accuracy of the activation operation. In the present embodiment described above, although the fourth bit MSB<4> of the first bit group MSB<4:1> is used to compensate for the input distribution signal IDST<4:1>, the present embodiment is merely an example of the present disclosure. For example, at least one bit other than the fourth bit MSB<4> among the bits that are included in the first bit group MSB<4:1> may be used to compensate for the input distribution signal IDST<4:1> based on the embodiments.

What is claimed is:

1. An arithmetic device comprising:
a multiplying-accumulating (MAC) circuit configured to perform a MAC arithmetic operation for weight data and vector data to generate an arithmetic result signal; and
an activation function (AF) circuit configured to extract a first bit group and a second bit group from the arithmetic result signal, configured to generate an input distribution signal based on the first bit group and the second bit group, and configured to select and output an output distribution signal that corresponds to the input distribution signal based on an activation function,
wherein the activation function circuit includes a look-up table, and
wherein a size of the look-up table corresponds to a number of bits of the first bit group.

2. The arithmetic device of claim 1,
wherein the first bit group includes at least one most significant bit among bits that are included in the arithmetic result signal; and
wherein the second bit group includes at least one second most significant bit among the bits that are included in the arithmetic result signal.

3. The arithmetic device of claim 1, wherein, based on the second bit group, the input distribution signal is generated to have the same data as the first bit group or is generated by adding a correction code to the first bit group.

4. The arithmetic device of claim 3,
wherein the input distribution signal is generated to have the same data as the first bit group when the second bit group is set to have a first state; and
wherein the input distribution signal is generated by adding the correction code to the first bit group when the second bit group is set to have a second state.

5. The arithmetic device of claim 4,
wherein the correction code is set to have a value of '0' when the second bit group is set to have the first state; and
wherein the correction code is set to have a value of '1' when the second bit group is set to have the second state.

6. The arithmetic device of claim 1, wherein, based on the first bit group and the second bit group, the input distribution signal is generated to have the same data as the first bit group or is generated by adding a correction code to the first bit group.

7. The arithmetic device of claim 6,
wherein the input distribution signal is generated to have the same data as the first bit group when the first bit group and the second bit group are set to have a first state; and
wherein the input distribution signal is generated by adding the correction code to the first bit group when the first bit group and the second bit group are set to have a second state.

8. The arithmetic device of claim 7,
wherein the correction code is set to have a value of '0' when the first bit group and the second bit group are set to have the first state; and
wherein the correction code is set to have a value of '1' when the first bit group and the second bit group are set to have the second state.

9. The arithmetic device of claim 1, wherein the AF circuit includes:
a bit group selector configured to extract the first bit group and the second bit group from the arithmetic result signal to output the first bit group and the second bit group;
a correction code generator configured to generate a correction code based on the second bit group;
an input distribution signal generator configured to add the correction code to the first bit group to generate the input distribution signal; and
an output distribution signal generator configured to select and output the output distribution signal that corresponds to the input distribution signal based on the activation function.

10. The arithmetic device of claim 1, wherein the AF circuit includes:
a bit group selector configured to extract the first bit group and the second bit group from the arithmetic result signal to output the first bit group and the second bit group;
a correction code generator configured to generate a correction code based on the first bit group and the second bit group;
an input distribution signal generator configured to add the correction code to the first bit group to generate the input distribution signal; and
an output distribution signal generator configured to select and output the output distribution signal that corresponds to the input distribution signal based on the activation function.

11. The arithmetic device of claim 1, wherein the AF circuit is configured to store the activation function in the look-up table for selecting the output distribution signal that corresponds to the input distribution signal.

12. The arithmetic device of claim 1,
wherein the weight data is set as weight values that are used in a neural network; and
wherein the vector data is set as feature values that are used in the neural network.

13. The arithmetic device of claim 1, wherein the MAC arithmetic operation includes a multiplying operation and an accumulative adding operation.

14. An arithmetic device comprising:
a bit group selector configured to extract a first bit group and a second bit group from an arithmetic result signal generated by a multiplying-accumulating (MAC) arithmetic operation to output the first bit group and the second bit group;
a correction code generator configured to generate a correction code based on the second bit group;

an input distribution signal generator configured to add the correction code to the first bit group to generate an input distribution signal;

an output distribution signal generator configured to select and output an output distribution signal that corresponds to the input distribution signal based on an activation function, a look-up table into which the activation function is stored, wherein a size of the look-up table corresponds to a number of bits of the first bit group.

15. The arithmetic device of claim 14, wherein the first bit group includes at least one most significant bit among bits that are included in the arithmetic result signal; and wherein the second bit group includes at least one second most significant bit among the bits that are included in the arithmetic result signal.

16. The arithmetic device of claim 14, wherein the input distribution signal is generated to have the same data as the first bit group when the second bit group is set to have a first state; and wherein the input distribution signal is generated by adding the correction code to the first bit group when the second bit group is set to have a second state.

17. The arithmetic device of claim 16, wherein the correction code is set to have a value of '0' when the second bit group is set to have the first state; and wherein the correction code is set to have a value of '1' when the second bit group is set to have the second state.

18. The arithmetic device of claim 14, wherein the MAC arithmetic operation includes a multiplying operation and an accumulative adding operation, which are performed for a first arithmetic input signal and a second arithmetic input signal;

wherein the first arithmetic input signal is set to have weight values that are used in a neural network; and wherein the second arithmetic input signal is set to have feature values that are used in the neural network.

19. An arithmetic device comprising:

a bit group selector configured to extract a first bit group and a second bit group from an arithmetic result signal generated by a multiplying-accumulating (MAC) arithmetic operation to output the first bit group and the second bit group;

a correction code generator configured to generate a correction code based on the first bit group and the second bit group;

an input distribution signal generator configured to add the correction code to the first bit group to generate an input distribution signal; and an output distribution signal generator configured to select and output an output distribution signal that corresponds to the input distribution signal based on an activation function, a look-up table into which the activation function is stored, wherein a size of the look-up table corresponds to a number of bits of the first bit group.

20. The arithmetic device of claim 19, wherein the input distribution signal is generated to have the same data as the first bit group when the first bit group and the second bit group are set to have a first state; and wherein the input distribution signal is generated by adding the correction code to the first bit group when the first bit group and the second bit group are set to have a second state.

* * * * *